US012153837B2

(12) United States Patent
Tokuda

(10) Patent No.: US 12,153,837 B2
(45) Date of Patent: Nov. 26, 2024

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Akihiko Tokuda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/451,926

(22) Filed: Aug. 18, 2023

(65) Prior Publication Data

US 2024/0069817 A1 Feb. 29, 2024

(30) Foreign Application Priority Data

Aug. 31, 2022 (JP) .................................. 2022-138344

(51) Int. Cl.
*G06F 3/12* (2006.01)
*H04N 1/00* (2006.01)

(52) U.S. Cl.
CPC .......... *G06F 3/1205* (2013.01); *G06F 3/1243* (2013.01); *H04N 1/00427* (2013.01)

(58) Field of Classification Search
CPC . G06F 3/1205; G06F 3/1243; H04N 1/00427; H04N 1/00726; H04N 1/00774; G03G 2215/00514; G03G 15/5016; G03G 15/234

See application file for complete search history.

(56) References Cited

U.S. PATENT DOCUMENTS

| 10,241,433 | B2* | 3/2019 | Tanaka | H04N 1/00774 |
| 2010/0134825 | A1* | 6/2010 | Pierce | G03G 15/502 |
| | | | | 358/1.15 |
| 2012/0200881 | A1* | 8/2012 | Yamato | G06K 15/1809 |
| | | | | 358/1.15 |
| 2013/0215437 | A1* | 8/2013 | Kojima | B41J 13/12 |
| | | | | 358/1.5 |
| 2015/0036172 | A1* | 2/2015 | Tachibana | B65H 9/00 |
| | | | | 358/1.14 |
| 2015/0375955 | A1* | 12/2015 | Kanematsu | G03G 15/502 |
| | | | | 271/2 |
| 2020/0033772 | A1* | 1/2020 | Hirano | H04N 1/00726 |
| 2023/0331029 | A1* | 10/2023 | Suzuki | B43M 5/042 |

FOREIGN PATENT DOCUMENTS

JP 5962741 B2 8/2016

* cited by examiner

*Primary Examiner* — Iriana Cruz
(74) *Attorney, Agent, or Firm* — ROSSI, KIMMS & McDOWELL LLP

(57) ABSTRACT

The present information processing apparatus performs, for a print job for which a request is to be made to a printing apparatus, a print setting according to a user operation via a setting screen. In addition, when a setting screen is displayed on a display unit and a setting related to a specific sheet is performed, the present information processing apparatus switches a predetermined object included in the setting screen from a display in which the predetermined object cannot be selected by the user to a display in which the predetermined object can be selected by the user.

25 Claims, 21 Drawing Sheets

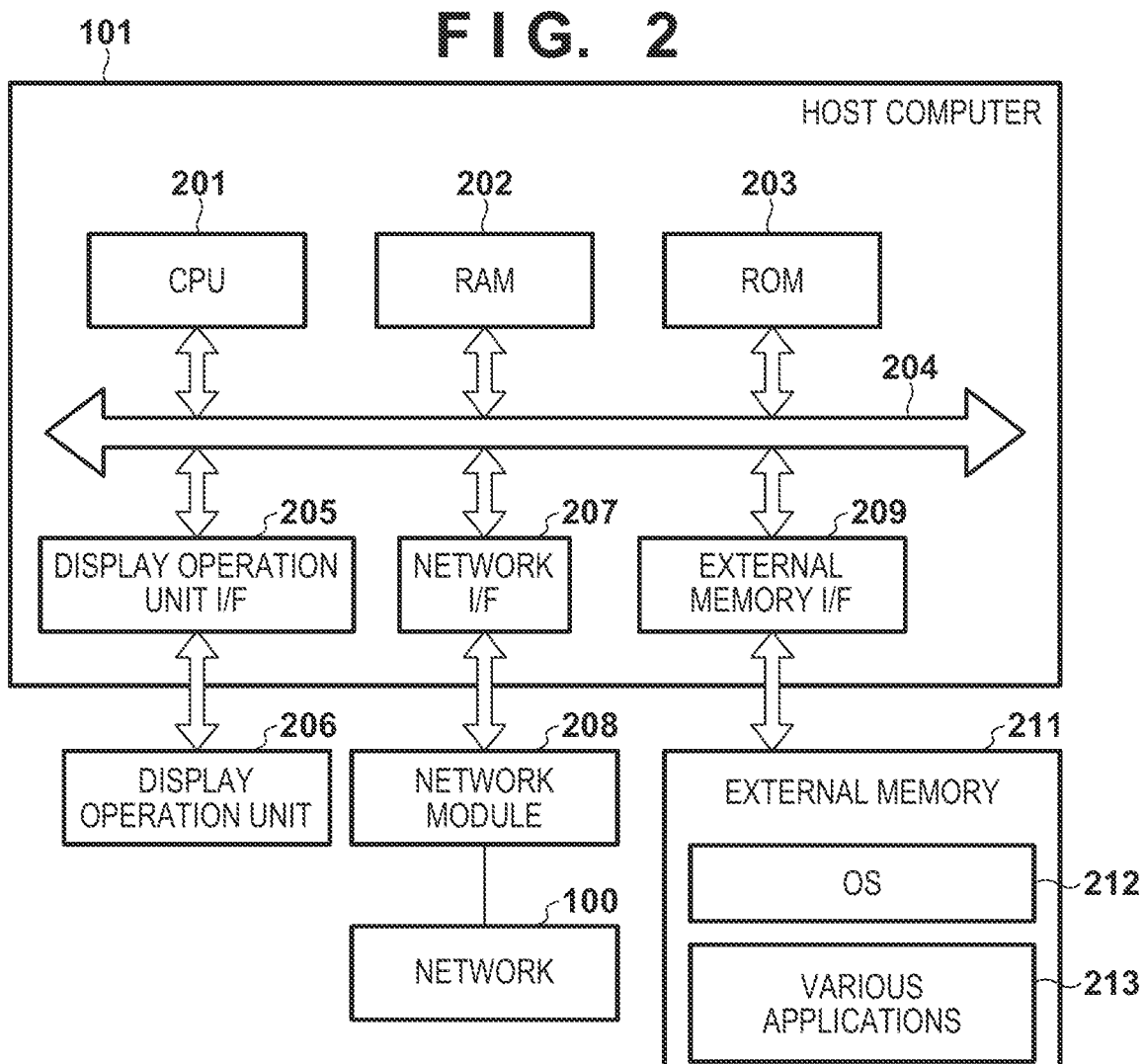
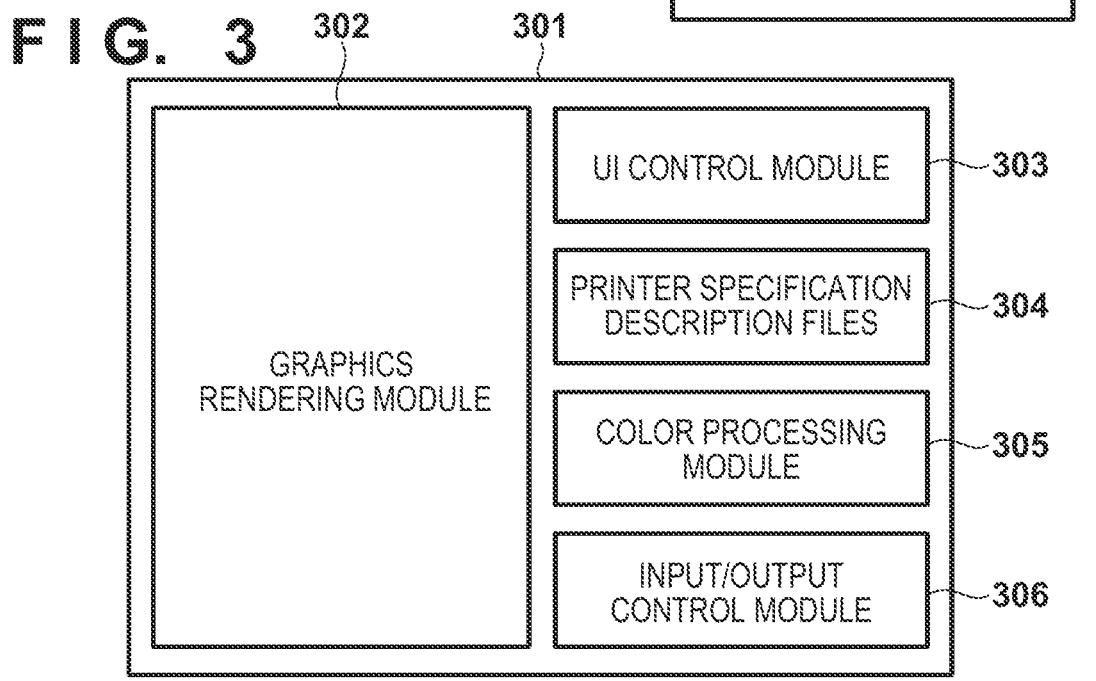

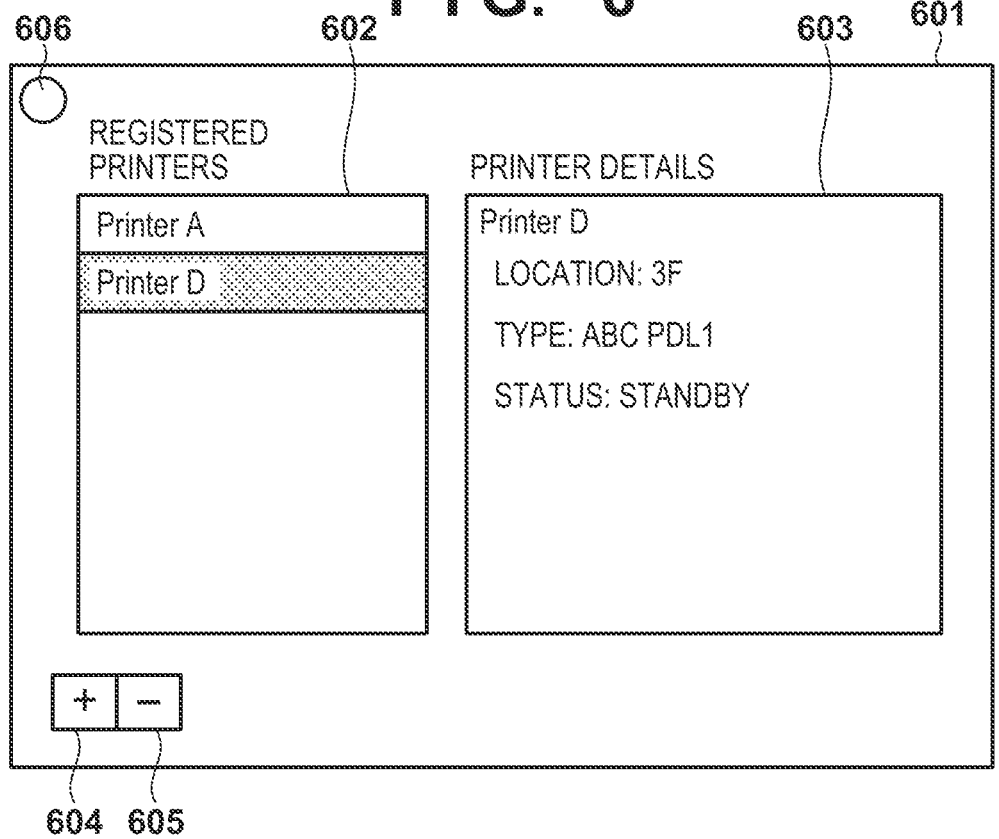

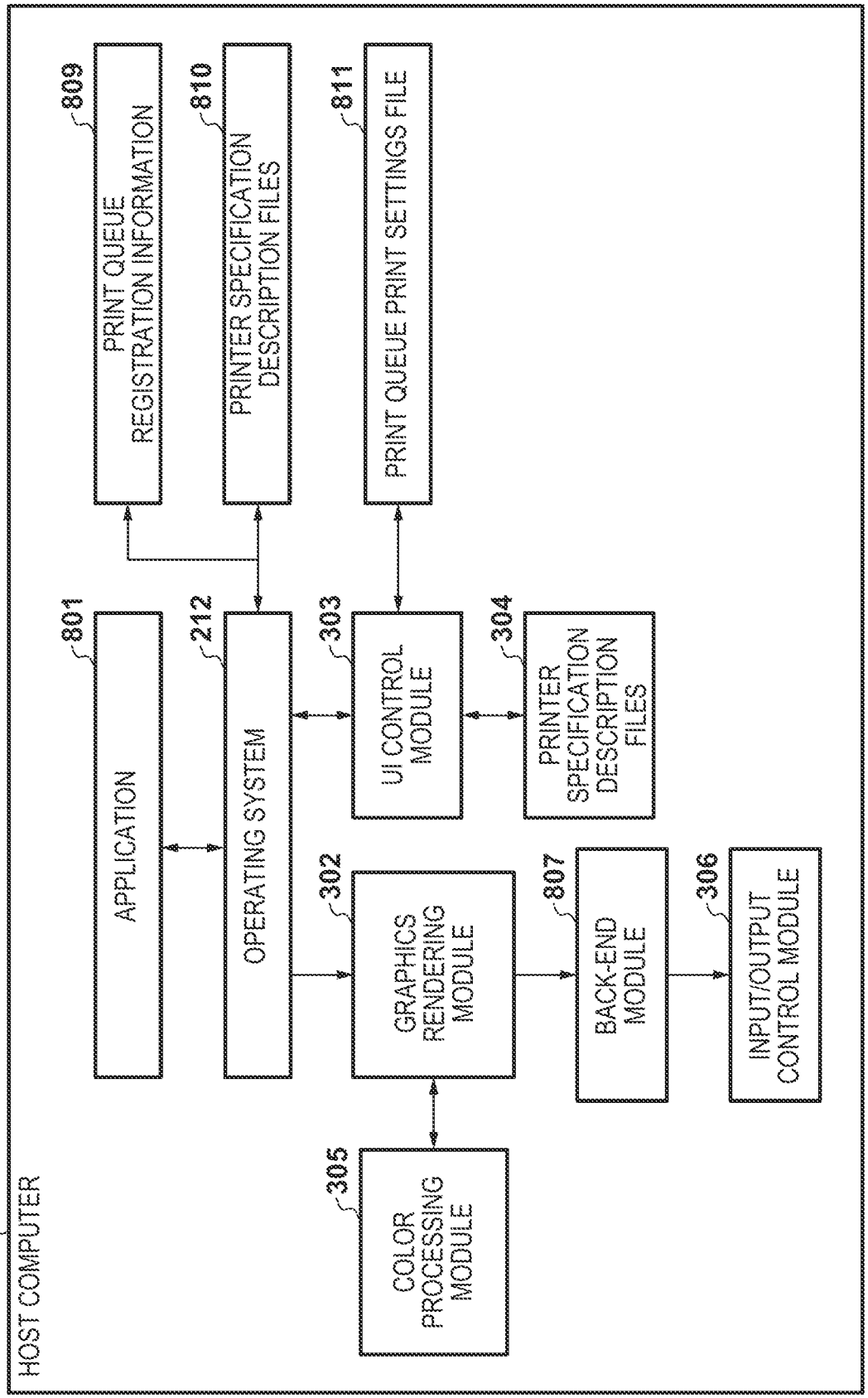

FIG. 9

```
901: <Printer PrinterC_192.168.1.10_>
902:     Info PrinterC
903:     Location 2F
904:     DeviceURI lpd://192.168.1.10
905:     DriverName ABC PDL1
906: </Printer>
```

FIG. 10

```
1001: *% Printer Description for Printer C
1002: *Manufacuturer: "ABC"
1003: *Product: "Printer C"
1004: *PrinterLanguage: ABC PDL1
1005: *DriverVersion: "PDL1 1.00"

1006: *OpenUI *PageSize: PickOne
1007: *DefaultPageSize: A4
1008: *PageSize A3
1009: *PageSize A4
      . . . . . .
1010: *CloseUI *PageSize 1011: *OpenUI *Duplex: PickOne
1012: *DefaultDuplex: None
1013: *Duplex None
1014: *Duplex Simplex
1015: *Duplex Duplex
1016: *CloseUI *Duplex
```

FIG. 11

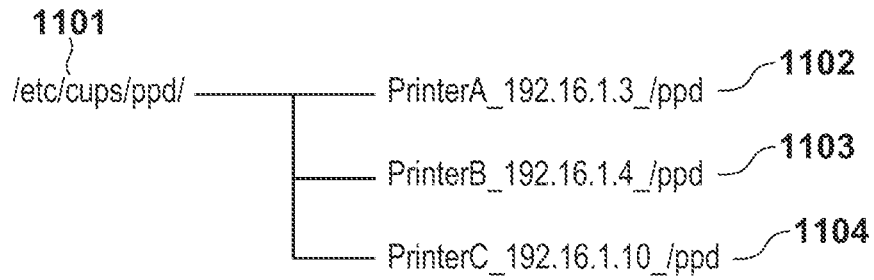

SHEET TYPE SETTING

| NAME | TYPE | GRAMMAGE | CHARACTERISTIC | SURFACE PROPERTY | COLOR |
|---|---|---|---|---|---|
| THICK PAPER 6(221 TO 256g/m²) | BASIC SHEET | — | NO | QUALITY PAPER | WHITE |
| THICK PAPER 6(257 TO 300g/m²) | BASIC SHEET | — | NO | QUALITY PAPER | WHITE |
| THICK PAPER 8(301 TO 325g/m²) | BASIC SHEET | — | NO | QUALITY PAPER | WHITE |
| THICK PAPER 9(326 TO 350g/m²) | BASIC SHEET | — | NO | QUALITY PAPER | WHITE |
| OHP FILM(91 TO 180g/m²) | BASIC SHEET | — | NO | OHP FILM | TRANSPARENT |
| TRANSPARENT FILM(91 TO 180g/m²) | BASIC SHEET | — | NO | FILM | TRANSPARENT |
| LABEL SHEET(118 TO 185g/m²) | BASIC SHEET | — | NO | LABEL | WHITE |
| TRACING PAPER(64 TO 90g/m²) | BASIC SHEET | — | NO | VELLUM | WHITE |
| POSTCARD(181 TO 220g/m²) | BASIC SHEET | — | NO | POSTCARD | WHITE |
| ENVELOPE(76 TO 105g/m²) | BASIC SHEET | — | ENVELOPE | QUALITY PAPER | WHITE |
| INDEX PAPER 1(91 TO 105g/m²) | BASIC SHEET | — | INDEX PAPER | QUALITY PAPER | WHITE |
| INDEX PAPER 2(106 TO 128g/m²) | BASIC SHEET | — | INDEX PAPER | QUALITY PAPER | WHITE |
| INDEX PAPERT 3(129 TO 180g/m²) | BASIC SHEET | — | INDEX PAPER | QUALITY PAPER | WHITE |
| INDEX PAPER 4(181 TO 220g/m²) | BASIC SHEET | — | INDEX PAPER | QUALITY PAPER | WHITE |
| ONE-SIDE COATED PAPER 1(106 TO 128g/m²) | BASIC SHEET | — | NO | SINGLE-SIDE COATED PAPER | WHITE |
| ONE-SIDE COATED PAPER 2(129 TO 150g/m²) | BASIC SHEET | — | NO | SINGLE-SIDE COATED PAPER | WHITE |
| ONE-SIDE COATED PAPER 3(151 TO 163g/m²) | BASIC SHEET | — | NO | SINGLE-SIDE COATED PAPER | WHITE |
| ONE-SIDE COATED PAPER 4(164 TO 180g/m²) | BASIC SHEET | — | NO | SINGLE-SIDE COATED PAPER | WHITE |
| ONE-SIDE COATED PAPER 5(181 TO 220g/m²) | BASIC SHEET | — | NO | SINGLE-SIDE COATED PAPER | WHITE |
| ONE-SIDE COATED PAPER 6(221 TO 256g/m²) | BASIC SHEET | — | NO | SINGLE-SIDE COATED PAPER | WHITE |
| ONE-SIDE COATED PAPER 7(257 TO 300g/m²) | BASIC SHEET | — | NO | SINGLE-SIDE COATED PAPER | WHITE |
| ONE-SIDE COATED PAPER 8(301 TO 325g/m²) | BASIC SHEET | — | NO | SINGLE-SIDE COATED PAPER | WHITE |
| ONE-SIDE COATED PAPER 9(326 TO 350g/m²) | BASIC SHEET | — | NO | SINGLE-SIDE COATED PAPER | WHITE |
| DOUBLE-SIDE COATED PAPER 1(106 TO 128g/m²) | BASIC SHEET | — | NO | DOUBLE-SIDE COATED PAPER | WHITE |

OBTAIN SHEET INFORMATION (R)

OK    CANCEL    HELP(H)

F I G. 14A
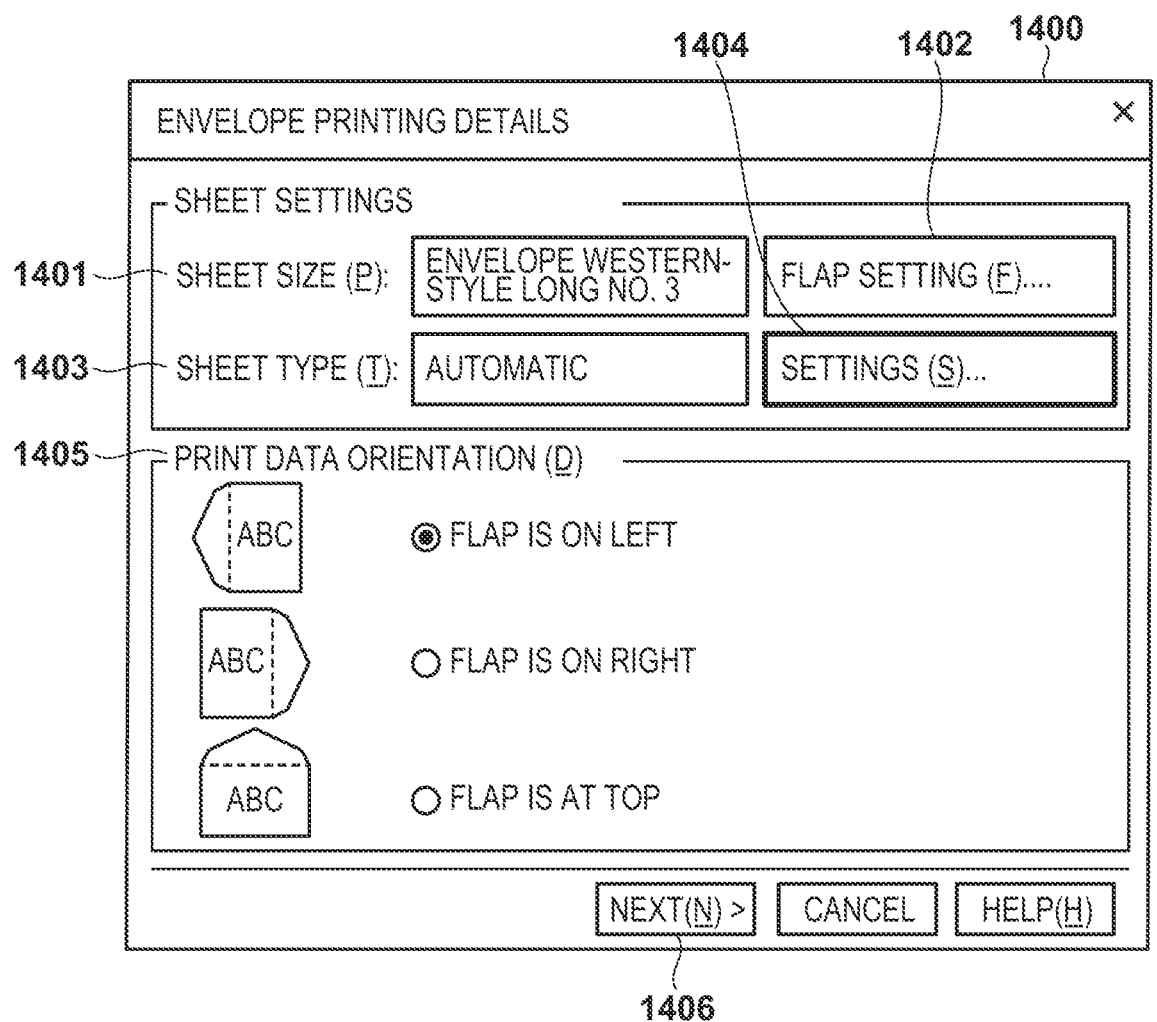

FIG. 14B

1410 — FLAP SETTING

1411 — FLAP POSITION (F)

- ○ LONG EDGE (CLOSED)
- ◉ LONG EDGE (OPEN)
- ○ SHORT EDGE (CLOSED)
- ○ SHORT EDGE (OPEN)

[ OK ] [ CANCEL ] [ HELP(H) ]

1420 — SHEET TYPE SETTING

SHEET TYPE (T):
1421

OBTAIN SHEET INFORMATION (R)

| NAME | TYPE | GRAMMAGE | CHARACTERISTIC | SURFACE PROPERTY | COLOR |
|---|---|---|---|---|---|
| AUTOMATIC | – | – | – | – | – |
| ENVELOPE (76 TO 105g/m²) | BASIC SHEET | – | ENVELOPE | QUALITY PAPER | WHITE |

[ OK ] [ CANCEL ] [ HELP(H) ]

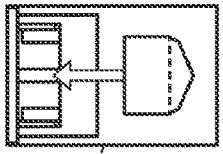

FIG. 19A

| FLAP POSITION | FLAP OPEN/CLOSED | PRINT DATA ORIENTATION | PAPER FEEDING UNIT | PRINT SIDE | ROTATE 180 DEGREES | DISPLAY IMAGE |
|---|---|---|---|---|---|---|
| SHORT EDGE | OPEN | ABC | MANUAL FEEDING | UP | YES | |
| SHORT EDGE | OPEN | ABC | MANUAL FEEDING | UP | NO | |
| SHORT EDGE | OPEN | ABC | MANUAL FEEDING | UP | NO | |
| SHORT EDGE | CLOSE | ABC | MANUAL FEEDING | UP | NO | |
| SHORT EDGE | CLOSE | ABC | MANUAL FEEDING | UP | YES | |
| SHORT EDGE | CLOSE | ABC | MANUAL FEEDING | UP | YES | |
| SHORT EDGE | OPEN | ABC | CASSETTE | DOWN | YES | |
| SHORT EDGE | OPEN | ABC | CASSETTE | DOWN | NO | |
| SHORT EDGE | OPEN | ABC | CASSETTE | DOWN | NO | |
| SHORT EDGE | CLOSE | ABC | CASSETTE | DOWN | NO | |
| SHORT EDGE | CLOSE | ABC | CASSETTE | DOWN | YES | |
| SHORT EDGE | CLOSE | ABC | CASSETTE | DOWN | YES | |

FIG. 19B

| | | | | | 1903 |
|---|---|---|---|---|---|
| LONG EDGE | OPEN | ABC | MANUAL FEEDING | UP | NO |
| LONG EDGE | OPEN | ABC | MANUAL FEEDING | UP | YES |
| LONG EDGE | OPEN | ABC | MANUAL FEEDING | UP | NO |
| LONG EDGE | CLOSE | ABC | MANUAL FEEDING | UP | YES |
| LONG EDGE | CLOSE | ABC | MANUAL FEEDING | UP | NO |
| LONG EDGE | CLOSE | ABC | MANUAL FEEDING | UP | YES |
| LONG EDGE | OPEN | ABC | CASSETTE | DOWN | NO |
| LONG EDGE | OPEN | ABC | CASSETTE | DOWN | YES |
| LONG EDGE | OPEN | ABC | CASSETTE | DOWN | NO |
| LONG EDGE | CLOSE | ABC | CASSETTE | DOWN | YES |
| LONG EDGE | CLOSE | ABC | CASSETTE | DOWN | NO |
| LONG EDGE | CLOSE | ABC | CASSETTE | DOWN | YES |

F I G. 20

```
 *
 *
SHEET SIZE: RECTANGLE NO. 2
PRINT ORIENTATION: LANDSCAPE
PAPER FEEDING UNIT: MANUAL FEEDING
180-DEGREE ROTATION: YES
 *
 *
```

2000

INFORMATION PROCESSING APPARATUS, CONTROL METHOD THEREOF, AND STORAGE MEDIUM

BACKGROUND OF THE INVENTION

Field of the Invention

The present invention relates to an information processing apparatus for performing print settings, a control method thereof, and a storage medium.

Description of the Related Art

Printer drivers that are installed in information processing apparatuses, such as host computers, and transmit created print data to a printing apparatus connected to the host computer are known. The printer drivers convert data of various applications that run on the host computer to print data.

In recent printing apparatuses, a wide variety of sheets can be fed, and the demand for printing on sheets (such as envelopes) with special sheet placement (feed orientation, print orientation, front side and back side) and sheet shape is increasing. For example, printing on envelopes, not only of domestic and international standard sizes (such as Long No. 3 and Monarch envelopes) but also of non-standard sizes that are different from the standard sizes, is performed in the market according to the size of the sheet to be enclosed. Japanese Patent No. 5962741 proposes a technique for designating, in an information processing apparatus, the position of a cover portion (hereinafter, referred to as the flap) for closing an envelope.

However, the aforementioned prior art has the following problems. When printing on an envelope using a printing apparatus, if one makes a mistake in the settings, such as the position of the flap and the opening/closing state of the flap, a desired printing result cannot be obtained. Also with postcards and the like, a desired printing result may not be obtained due to a mistake in the settings, such as those for the address side and the communication side, the top/bottom of the address side, and the like. Thus, when printing on a special sheet, it is necessary to ensure that the print settings are performed without omission.

SUMMARY OF THE INVENTION

The present invention enables realization of a mechanism for reducing undesired printing on a specific sheet.

One aspect of the present invention provides an information processing apparatus comprising: at least one memory device that stores a set of instructions; and at least one processor that executes the set of instructions to: perform, for a print job for which a request is to be made to a printing apparatus, a print setting according to a user operation via a setting screen; display the setting screen on a display unit and, in a case where a setting related to a specific sheet is performed, switch a predetermined object included in the setting screen from a display in which the predetermined object cannot be selected by the user to a display in which the predetermined object can be selected by the user.

Another aspect of the present invention provides a method of controlling an information processing apparatus, the method comprising: performing, for a print job for which a request is to be made to a printing apparatus, a print setting according to a user operation via a setting screen; displaying the setting screen on a display unit and, in a case where a setting related to a specific sheet is performed, switching a predetermined object included in the setting screen from a display in which the predetermined object cannot be selected by the user to a display in which the predetermined object can be selected by the user.

Still another aspect of the present invention provides a non-transitory computer-readable storage medium storing a computer program for causing a computer to execute each step of a method of controlling an information processing apparatus, the method comprising: performing, for a print job for which a request is to be made to a printing apparatus, a print setting according to a user operation via a setting screen; displaying the setting screen on a display unit and, in a case where a setting related to a specific sheet is performed, switching a predetermined object included in the setting screen from a display in which the predetermined object cannot be selected by the user to a display in which the predetermined object can be selected by the user.

Further features of the present invention will be apparent from the following description of exemplary embodiments with reference to the attached drawings.

BRIEF DESCRIPTION OF THE DRAWINGS

FIG. 2 is a block diagram illustrating a configuration of an information processing apparatus according to one embodiment.

FIG. 3 is a module configuration diagram of a printer driver according to one embodiment.

FIG. 6 is a diagram illustrating a user OF for registering to a print queue according to one embodiment.

FIG. 7 is a diagram illustrating a user OF for adding to a print queue according to one embodiment.

FIG. 8 is a system block diagram of a printer driver according to one embodiment.

FIG. 9 is a diagram illustrating a registration queue file according to one embodiment.

FIG. 10 is a diagram illustrating a printer specification description file according to one embodiment.

FIG. 11 is a diagram illustrating a storage example of printer specification description files in an OS according to one embodiment.

FIG. 12B is a diagram illustrating a printer driver display example 2 according to one embodiment.

FIG. 13B is a diagram illustrating a printer driver display example 4 according to one embodiment.

FIG. 14A is a diagram illustrating a display example 1 of a first screen of an envelope wizard according to one embodiment.

FIG. 14B is a diagram illustrating display examples 2 and 3 of the first screen of the envelope wizard according to one embodiment.

FIG. 15A is a diagram illustrating display examples 1 and 2 of a second screen of the envelope wizard according to one embodiment.

FIGS. 19A-19B are a diagram illustrating a setting pattern related to print settings of an envelope according to one embodiment.

FIG. 20 is a schematic view of print data according to one embodiment.

DESCRIPTION OF THE EMBODIMENTS

Figure 1:
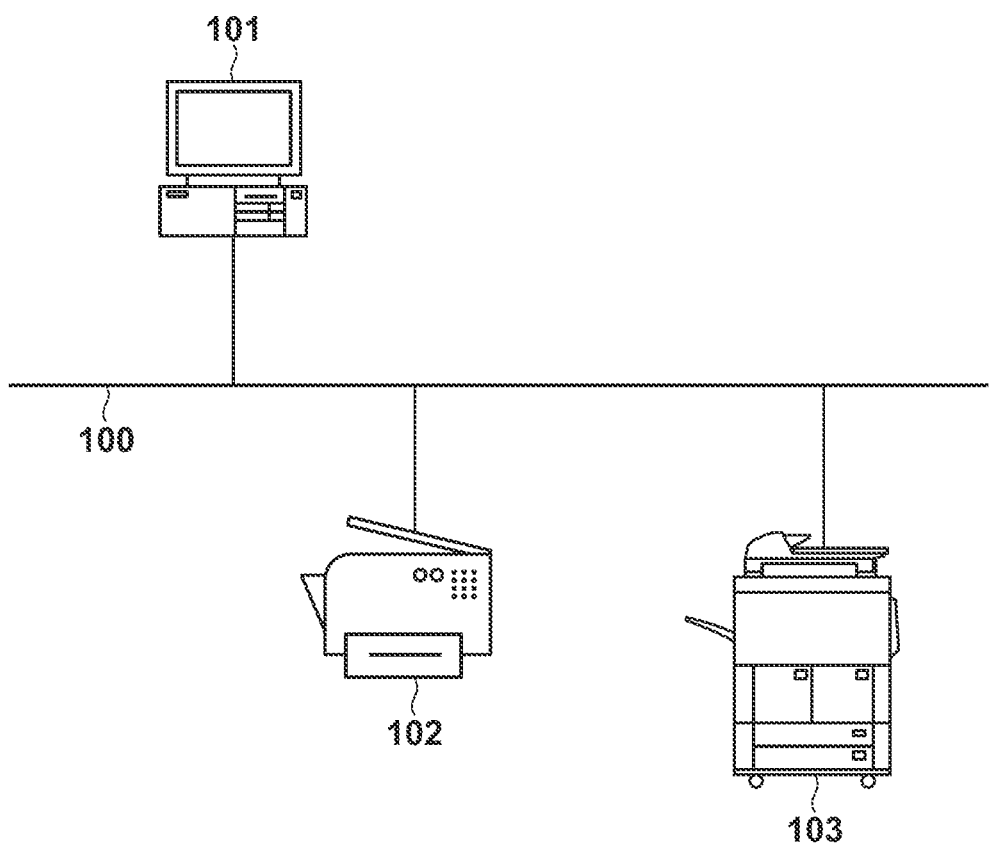
FIG. 1 is an overall view of a system according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

<System Configuration>

In the following, one embodiment of the present invention will be described. First, an overall configuration of the present system according to the present embodiment will be described with reference to FIG. 1. The system is configured to include a host computer 101 and printing apparatuses 102 and 103, and each apparatus is connected to a network 100 so as to be capable of communication.

The host computer 101 is an example of an information processing apparatus. The present embodiment is realized, for example, by an operating system 212 in the host computer 101 executing, using a CPU 201, a printer driver 301 that has been loaded into a RAM 202. The host computer 101 can instruct a print job to the printing apparatus 102 or 103 or the like via the printer driver 301.

The printing apparatus 102 will be described using a single function printer (SFP) as an example. The printing apparatus 103 will be described using a multifunction printer (MFP) as an example. The printing apparatuses to be included in the present system need only have a printing function and may be an SFP, an MFP, a facsimile apparatus, and the like. The present invention is not intended to be limited to the illustrated type and number of apparatuses; another type of apparatus may be included, and the number of apparatuses may be arbitrarily increased or decreased.

<Configuration of Information Processing Apparatus>

Next, an internal configuration of the host computer 101 according to the present embodiment will be described with reference to FIG. 2. The host computer 101 includes the CPU 201, the RAM 202, a ROM 203, a display operation unit OF 205, a network OF 207, and an external memory I/F 209. The respective devices are connected so as to be able to transmit and receive data to and from each other via a system bus 204.

The CPU 201 comprehensively controls each device connected to the system bus 204 according to a computer program stored in the ROM 203. The RAM 202 functions as a main memory, a work area, and the like of the CPU 201. The ROM 203 stores various kinds of basic programs and data of the system.

The display operation unit OF 205 performs control for displaying information on a display operation unit 206. The display operation unit 206 has a display function and is a touch panel at the same time and receives inputs from a user. The network OF 207 controls a network module 208 and realizes network communication between the host computer 101 and an external apparatus. The external memory OF 209 controls access to an external memory 211, such as a flash memory or a solid state disk, for example. The external memory 211 stores the operating system program (hereinafter, OS) 212 and various applications 213 and functions as a storage medium to or from which the host computer 101 can write or read.

<Printer Driver Details>

Next, a printer driver to be executed on the host computer 101 according to the present embodiment will be described with reference to FIG. 3. FIG. 3 illustrates a module configuration of the printer driver 301.

The printer driver 301 is configured to include a graphics rendering module 302, a UI control module 303, printer specification description files 304, a color processing module 305, and an input/output control module 306. The invention is not intended to be limited, and the printer driver 301 may include a module for realizing another function.

The graphics rendering module 302 issues a page description language and a printer control command to a printing apparatus. The UI control module 303 controls a printer driver UI screen to be displayed on the host computer 101. The printer specification description files 304 include a specification description file for each printing apparatus connected to the network 100. The UI control module 303 controls various UIs based on the printer specification description files 304. The color processing module 305 performs processing related to color processing of a print product. The input/output control module 306 controls input and output to and from a printing apparatus connected via the network 100.

There are a plurality of methods of creating such a printer driver. For example, in order for a single printer driver to support a plurality of printing apparatuses (hereinafter also referred to as printers), the graphics rendering module 302 and the UI control module 303 are created to be able to support a plurality of printers. In addition, the creation method is such that the printer specification description files 304 are included in the printer driver for all supported printers. In such a method, the UI control module 303 displays and controls a UI according to a printer specification of the printer to which a request for a print job is to be made among the printer specification description files 304. In addition, the graphics rendering module 302 can issue a page description language and a printer control command that accords with each printer.

<Installation Procedure>

Figure 4:
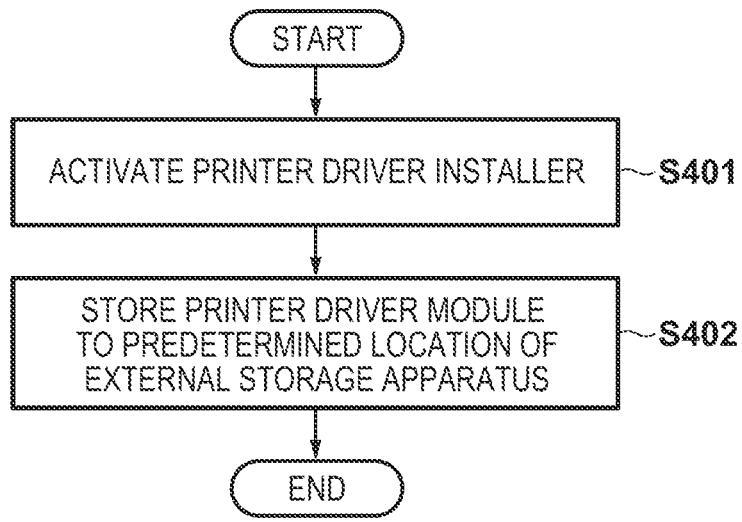
FIG. 4 is a flowchart for explaining a method of installing the printer driver according to one embodiment.

Next, a basic procedure for installing a printer driver to the host computer 101 will be described with reference to FIG. 4. The processing to be described below is realized by, for example, the CPU 201 of the host computer 101 reading a program stored in a memory, such as the ROM 203, in the RAM 202 and executing the program. The printer driver may be obtained from a CD-ROM or may be obtained via a printer driver installer via a network. Here, a description will be given using an example in which a printer driver installer is used. The "S" indicated below indicates a step number of each process in the flowchart. It is similar for the subsequent drawings.

First, in step S401, the CPU 201 starts a printer driver installer stored in the external memory 211. Subsequently, in step S402, the CPU 201 stores a printer driver module in a predetermined location in the external memory 211, using the printer driver installer.

The storage location is different depending on the printing system. As one example, in the Common Unix Printing System (CUPS), a printer driver module is stored under a "/Library/Printers/" directory by printer vendor. Furthermore, it is possible to separately store printer driver modules by printer driver type under the directory of each printer vendor. For example, assume a case where there are different printer drivers, a PDL1 and a PDL2, of a printer vendor, ABC. In this case, a "/Library/Printers/ABC/PDL1/" directory and a "/Library/Printers/A BC/PDL2/" directory are created, and the printer drivers are stored in their respective directories.

When the printer driver module is stored in the aforementioned directory of the external memory 211 in step S402, the printer driver installation is completed. When actually making output to a printer, it is necessary to register the printer in a print queue using the printer driver.

<Printer Registration Procedure>

Next, a procedure for registering a printer in a print queue will be described with reference to FIG. 5. The processing to be described is realized by, for example, the CPU 201 of the host computer 101 reading a program stored in a memory, such as the ROM 203, in the RAM 202 and executing the program.

In step S501, the CPU 201 displays a printer registration screen on the display operation unit 206 according to a user operation. FIG. 6 illustrates an example of a registration screen 601. In the registration screen 601, a registration list 602, a detail display region 603, and buttons 604 to 606 are displayed. In the registration list 602, a list of printers that are currently registered in the print queue is displayed. FIG. 6 illustrates an example in which Printer A and Printer D are registered. In the detail display region 603, the detailed information of a printer that is selected in the registration list 602 is displayed. As the detailed information, information, such as a location at which the corresponding printer is installed, the type of printer, and the operation status of the printer, is displayed. The button 604 is a button for newly registering a printer. The button 605 is a button for deleting, from the print queue, a printer that is currently selected in the registration list 602. The button 606 is a button for closing the registration screen 601 and transitioning to the original screen.

Figure 5:
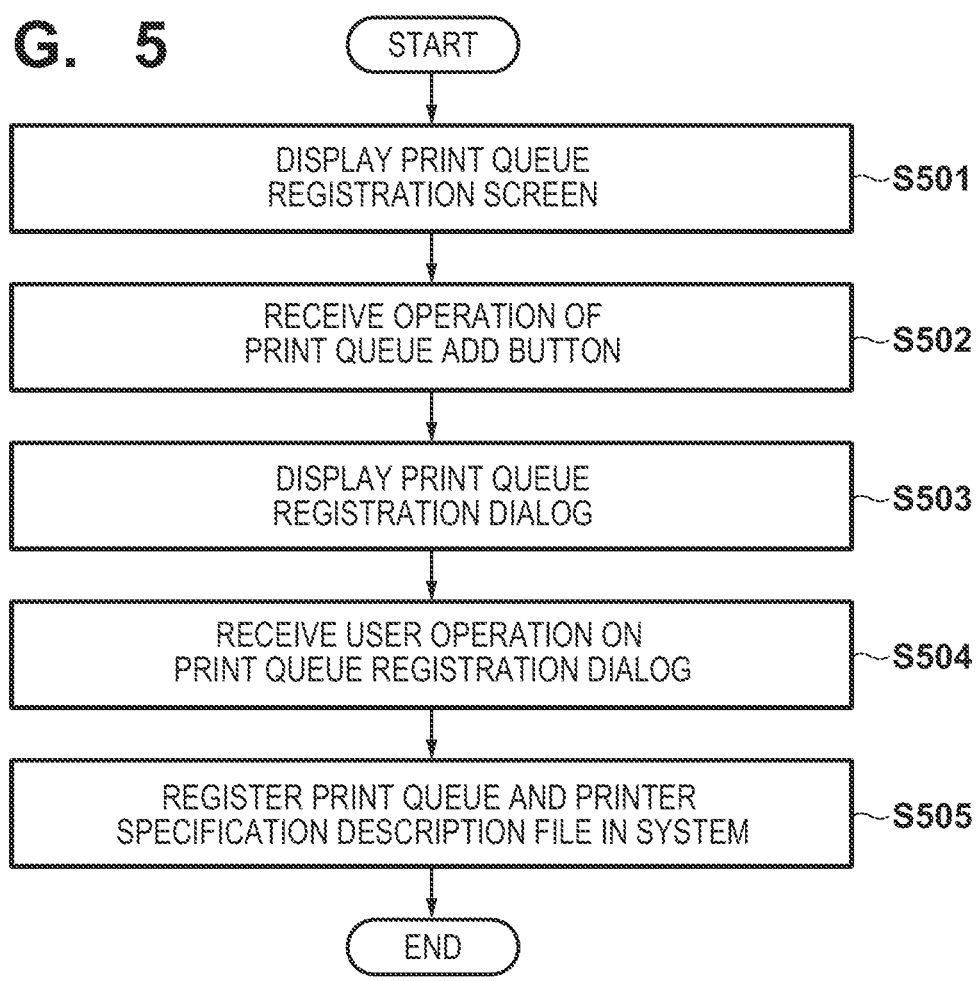
FIG. 5 is a flowchart for explaining a method of registering a printer to a print queue according to one embodiment.

The description of FIG. 5 is returned to. Next, in step S502, the CPU 201 receives the operation of the button 604 for adding a printer to the print queue on the registration screen 601. Upon receiving this user operation, in step S503, the CPU 201 displays a printer addition dialog 701 on the display operation unit 206. In step S504, the CPU 201 receives input of necessary information according to a user operation via the dialogue displayed here and then adds the printer.

FIG. 7 illustrates an example of the addition dialog 701. The addition dialog 701 is configured to include input regions 702 to 705 and buttons 706 to 708. The input region 702 is a region for specifying a network address (in this case, an IP address) of the connected printer. The input region 703 is a region for inputting a name for identifying a printer to be additionally registered. The input region 704 is a region for inputting a location at which the printer is installed. The input regions 703 and 704 are character strings that are used when displaying the registration list 602 and the detail display region 603 on the registration screen 601. The input region 705 is a region for designating a printer driver to be used when registering the printer. Regarding the printer drivers to be listed here, the CPU 201 lists the printer drivers that are stored in the previously-described printer driver storage directory (/Library/Printers) of the OS 212. In the example of FIG. 7, the state is that in which the address is 192.168.1.10, the printer name is "Printer C", the location is "2F", and "ABC PDL1" is selected as the printer driver. When the add button 706 is operated in this state, the CPU 201 adds the printer. When closing the addition dialog 701 without addition, the button 707 or the button 708 is selected.

The description of FIG. 5 is returned to. Next, in step S505, the CPU 201 registers the user-specified printer in the system. The processing of step S505 will be described in detail with reference to FIG. 8. FIG. 8 illustrates a state in which the printer driver 301 illustrated in FIG. 3 has already been installed on the host computer 101 and the printer is registered in the print queue. In the same figure, the graphics rendering module 302 is installed in a predetermined directory (/Library/Printers/) of the OS 212 by the above-described procedure. A back-end module 807 is provided by the OS 212 and is a module that passes print data generated by the graphics rendering module 302 to the input/output control module 306, which transmits the print data to the printer. Print queue registration information 809, a printer specification description file 810, and a print queue setting file 811 are generated by the OS 212 in the process for registering a printer in a print queue of FIG. 5, and the details thereof will be described in the following. In the present embodiment, an application 801 is an application for generating a document file and an image file, and data created in the application 801 is printed.

In step S505, the CPU 201 obtains the information inputted in the addition dialog 701 and then performs a printer registration operation. This registration is performed as follows. FIG. 9 illustrates a file describing the information of a printer to be registered, and the file is described in a markup language. Reference numeral 901 is an identifier of the printer and describes the printer name and an underscore followed by the printer address. Reference numeral 902 describes the name of the printer. Reference numeral 903 describes a location at which the printer is installed. Reference numeral 904 describes an actual print queue and, in this case, indicates performing transmission to the address 192.168.1.10 using the lpd protocol. Reference numeral 905 describes the name of a printer driver (in this case, ABC PDL1) to be used by this printer. Reference numeral 906 indicates the end of printer description of the file. In step S505, the CPU 201 creates the above-described description and then adds the corresponding printer registration information to a predetermined file in the external memory 211. A predetermined file is, for example, a printers.conf file stored in an "/etc/cups/" directory in a CUPS system. This is the print queue registration information 809. If a plurality of print queues are registered, in printers.conf, the description of FIG. 9 is repeated as many times as the number of print queues for each corresponding printer.

Furthermore, in step S505, the CPU 201 registers the printer specification description file 304 in the system. The CPU 201 obtains the printer specification description file 304 of the printer to be registered from the UI control module 303 and then registers it in a predetermined system location (printer specification description file 810) prepared for each print queue.

Here, before explaining the details of a method of registering the printer specification description file 304, the printer specification description file 304 itself will be described. FIG. 10 illustrates an example of the printer specification description file 304. The printer specification description file 304 is described according to a printer specification description format. In the following, a description will be given taking that format into account. Reference numeral 1001 describes a comment. Regarding comments, lines begin with "*%". Reference numeral 1002 describes the name of a printer vendor. Reference numeral 1003 describes the name of a printer to which the printer specification description file 304 corresponds. Reference numeral 1004 describes the page description language supported by the printer specification description file 304. Reference numeral 1005 describes the version of a printer driver. From reference numeral 1006 onward, the functional specifications of this printer are described.

Regarding the function specifications, from line 1006, "*OpenUI", to line 1010, "*CloseUI", is one function. "*OpenUI" is followed by a function name to which "*" has been added at the beginning, and the function name is followed by a type thereof for when that function is selected, separated by ":". Regarding the type, there are "PickOne" and "Boolean"; "PickOne" indicates that the function is that in which one is selected from the options. In addition, "Boolean" indicates that the function is controlled by on/off. In reference numeral 1006, it is indicated that there is a function called PageSize and the function is that in which one option (here, a size) is selected from a plurality of options. In line 1007, the default value for this function is described. This line begins with "*Default", followed by the function name defined in the previous line. This line indicates that the default of a function called PageSize is A4. From line 1008 to line 1010, "*CloseUI", the options for this function are described, one option per line. For example, in reference numeral 1008, A3 is described as one option of PageSize. This describes a function in which a page size is selected, and since there many options, page sizes are omitted. The last description of this function is reference numeral 1010, and after "*CloseUI", a function name described with "*OpenUI" is described. This represents one function.

The following lines 1011 to 1016 describe another function. Although overlapping descriptions will be omitted, this block describes a function called Duplex and indicates that any one option is selected and that an option is selected from None, Simplex, and Duplex. In actuality, this represents a function for designating duplex printing, and since None indicates that no designation is made, the default accords with the default settings of the printer; Simplex indicates an option of single-sided printing, and Duplex indicates an option of double-sided printing.

Next, a detailed method of registering the printer specification description file 304 will be described. The CPU 201 obtains the printer specification description file 304 corresponding to a printer from the UI control module 303 and stores it in a predetermined location (printer specification description file 810) in the system. FIG. 11 illustrates a storage location and files thereof. The storage location is under the directory "/etc/cups/ppd/" indicated by reference numeral 1101 of the external memory 211. The directory stores a plurality of files, as indicated by reference numerals 1102, 1103, and 1104. It is assumed that a file to be stored at the time of additional registration has, as its file name, the name of the printer followed by an underscore and then the printer address. The printer specification description file 810 added here is, for example, "PrinterC_192.168.1.10_.ppd" indicated by reference numeral 1104. When the registration processing of step S505 is completed, the processing of this flowchart ends, and the registration of the printer is completed.

<Examples of Setting Screens>

In the following, examples of setting screens according to the present embodiment will be described with reference to FIG. 12A to FIG. 15B. Here, setting screens will be described using, as an example, printing in which an envelope sheet is used as one example of a specific sheet. First, a print settings screen according to the present embodiment will be described with reference to FIG. 12A.

Figure 12A:
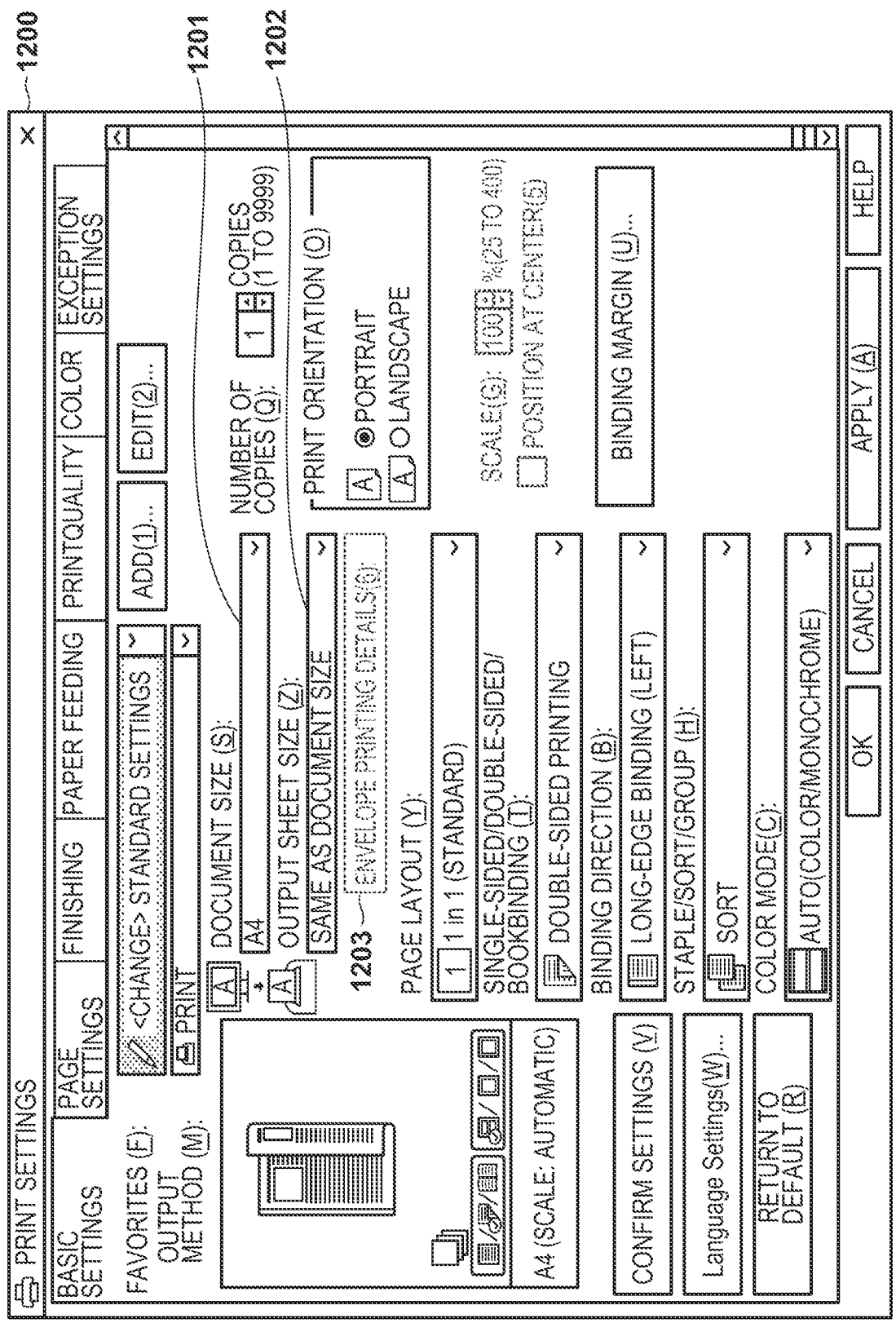
FIG. 12A is a diagram illustrating a printer driver display example 1 according to one embodiment.

A print settings screen 1200 illustrated in FIG. 12A is a screen for performing print-related settings for when making a request for a print job to the printing apparatus 102 or 103, and various settings can be performed in each of a plurality of tabs. FIG. 12A illustrates a setting screen of a tab for performing "basic settings" among a plurality of tabs. As other settings tabs, a "page settings" tab for performing print-page-related settings, a "finishing" tab for performing binding direction and double-sided settings, and a "paper feeding" tab for designating a paper feeding source are included. Furthermore, a "print quality" tab for setting a print quality level, a "color" tab for setting a mode related to color, and an "exception settings" tab for setting various exception processes are included. These print settings tabs are only one example, and an arbitrary print tab may be included according to the capabilities of the target printing apparatus.

In the "basic settings" tab illustrated in FIG. 12A, settings, such as at least a document size, an output sheet size, a page layout, single-sided/double-sided printing, a binding direction, stapling/sorting, a color mode, a binding margin, scale, the number of copies, and a print orientation, can be performed. According to the present embodiment, a button for performing settings for a specific sheet is included as indicated by reference numeral 1203. The button 1203 is an example of a predetermined object and is arranged near an object, such as a document size 1201 or an output sheet size 1202. As illustrated in FIG. 12A, as a default display of the print settings screen 1200, the button 1203 is displayed so as to be unselectable by being grayed out. Meanwhile, the button 1203 is displayed so as to be selectable when a predetermined condition is satisfied. The aforementioned predetermined condition is, for example, a condition that depends on the setting statuses of the document size 1201 and the output sheet size 1202, and the condition is that a setting related to a specific sheet is performed.

When the document size 1201 is operated, a list that includes a plurality of document sizes is displayed as a pop-up, and any of the document sizes can be selected. When the output sheet size 1202 is operated, a list that includes a plurality of sheets is displayed as a pop-up as print target sheets, and any of the sheets can be selected. Here, when a document size related to a specific sheet, such as an envelope or a postcard, is set as the document size or the output sheet size, the above-described predetermined condition is satisfied.

Figure 12B:
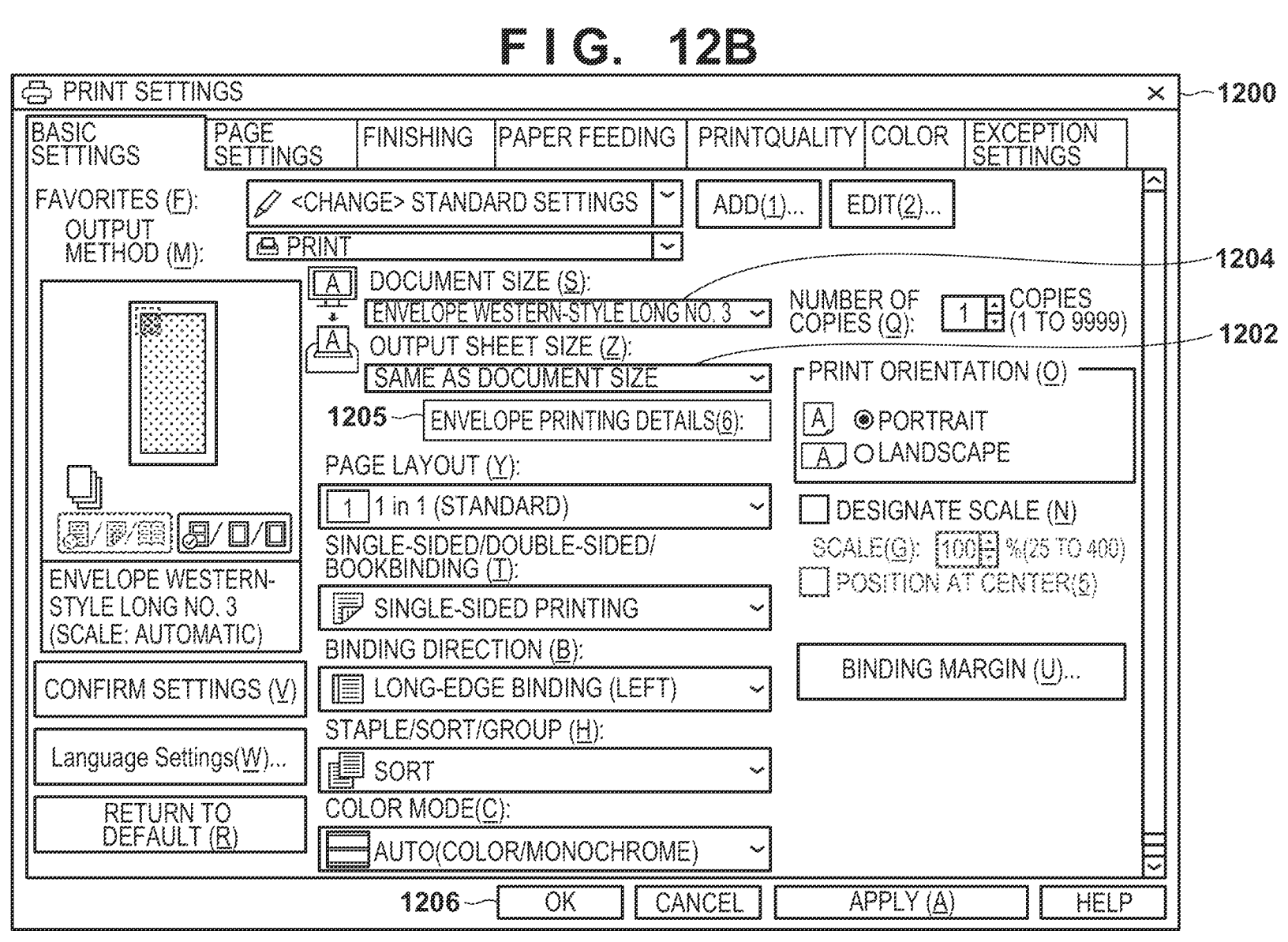

FIG. 12B illustrates the print settings screen 1200 in which a size that is a specific sheet is set. As indicated by reference numeral 1204, here, the document size 1201 has been operated and the size "Envelope Western-style Long No. 3" is selected. In such a case, the CPU 201 determines a setting related to a specific sheet has been performed and switches the display of the button 1203 that had been grayed out to be a selectable button 1205. "Envelope printing details" is displayed on the button 1205, and it can be easily recognized by the user that settings related to envelope printing can be performed by selecting the button.

In addition, the button 1203 is arranged near the document size 1201 and the output sheet size 1202 for performing settings related to a specific sheet. Therefore, the display switches near the region on which the user is focusing when the user performs a setting related to a specific sheet; thus, the user can easily confirm the change in the object, and the effect of prompting advanced settings of a specific sheet can be expected. In the present embodiment, the control for switching from an unselectable, gray-out display to a normal selectable display in response to a predetermined condition being satisfied will be described. However, the present invention is not limited, and various emphasized displays may be performed to prompt the user to perform settings for envelope printing. For example, a highlight display or a blinking display may be performed, or a message or the like that advanced settings of envelope printing have become possible may be displayed in a pop-up. This makes it possible to guide the user to perform advanced settings related to a specific sheet.

Figure 13A:
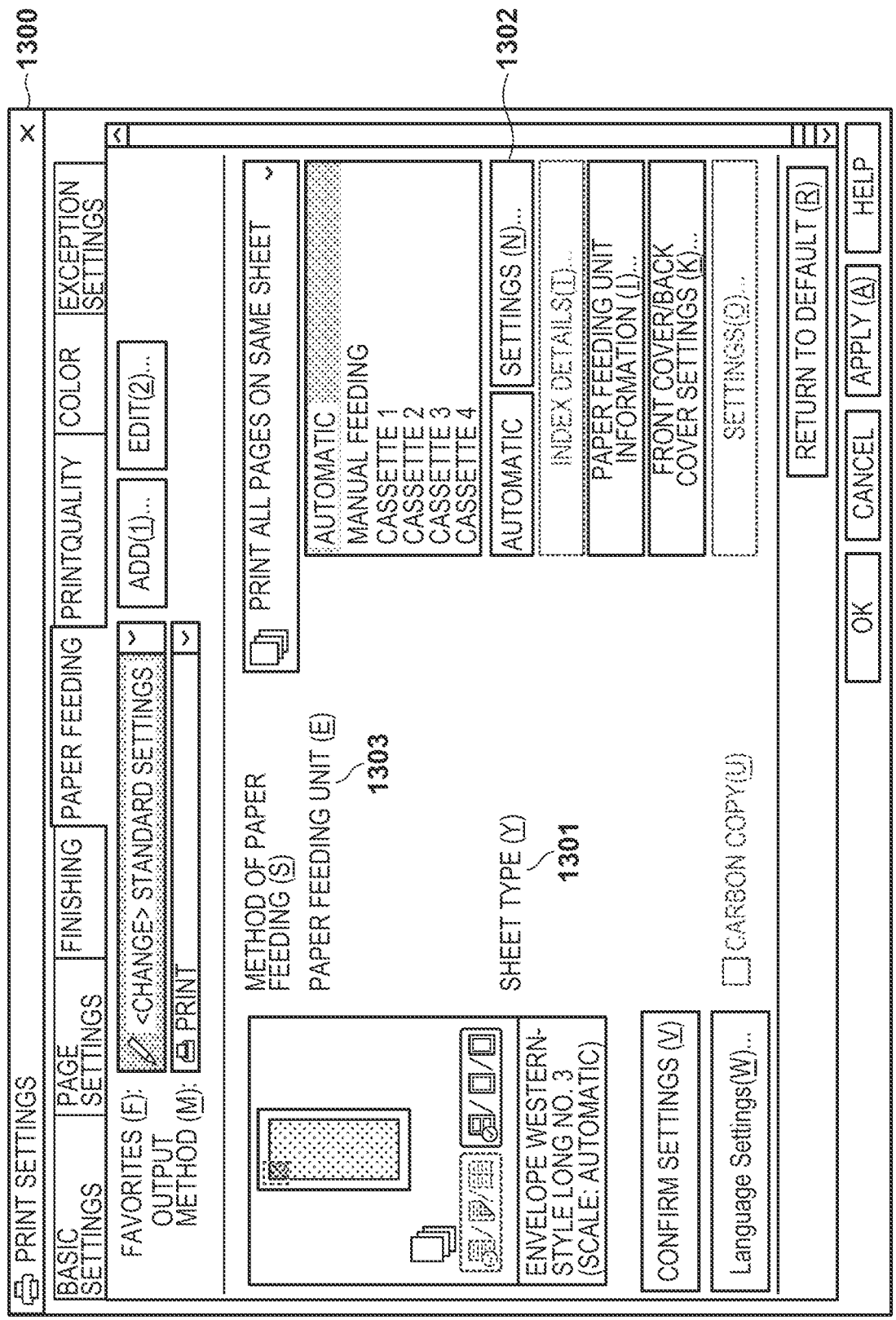
FIG. 13A is a diagram illustrating a printer driver display example 3 according to one embodiment.

FIG. 13A illustrates a print settings screen 1300 for when the "paper feeding" tab has been selected. In the print settings screen 1300, it is possible to set a paper feeding unit 1303, such as a manual feeding tray or cassette, which is a paper feeding source, and a sheet type setting 1301. In the paper feeding unit 1303, automatic, manual feeding, and cassettes 1 to 4, for example, can be selected as the paper feeding source according to the specifications of a corresponding printing apparatus. In the sheet type setting 1301, the sheet type can be set, and in the example illustrated in FIG. 13A, "automatic" is set; the setting can be changed by operating a settings button 1302. When the settings button 1302 is operated, a sheet type setting screen 1310 illustrated in FIG. 13B is transitioned to. In the setting screen 1310, a list 1312 of sheet types that can be set is displayed in a selectable manner. By operating a button 1313, the information of the list 1312 can be updated. By selecting a desired sheet type from the sheet types of the list 1312 and selecting an OK button 1311, the user can designate the sheet type. When the OK button 1311 is selected, the selected sheet type is reflected and the display returns to the print settings screen 1300.

FIG. 14A illustrates a first screen 1400, which is an advanced settings screen that is displayed on the display operation unit 206 when the selectable button 1205 of FIG. 12B is operated. The advanced settings screen, which will be described below, will be described using, as an example, a series of screens (hereinafter referred to as the envelope wizard) for performing settings related to an envelope. In the envelope wizard, a plurality of screens (such as the first screen 1400 and a second screen 1500) for performing settings related to an envelope are sequentially displayed in an interactive format according to a user operation. Therefore, the user can easily perform settings related to a specific sheet without omission, and thus, undesired printing results can be reduced.

In the first screen 1400, a sheet size 1401, a sheet type 1403, a print data orientation 1405, and buttons 1402, 1404, and 1406 are displayed. A size corresponding to the selected document size 1204 is displayed in the sheet size 1401 in a changeable manner, and here, it is displayed, "Envelope Western-style Long No. 3". When the sheet size 1401 is selected, selectable sheet sizes are displayed in a list as special sheets. Among the sheet sizes that are supported by the printing apparatus, only the sheet sizes that are registered as special sheets are displayed in the list. The sheet type that has been set using the settings button 1302 is displayed in the sheet type 1403 in a changeable manner, and here, "automatic" is displayed. When the sheet size 1401 is selected, the usable sheet sizes are displayed in a list, and the setting value of the sheet size can be changed. The sheet sizes to be displayed in the aforementioned list are only the sheet sizes that correspond to special sheets. When the sheet type 1403 is selected, the usable sheet types are displayed in a list, and the setting value of the sheet type can be changed. The sheet types to be displayed in the list of sheet types are only "automatic" and the sheet types that correspond to special sheets. In the print data orientation 1405, a plurality of radio buttons (on left, on right, and at top) for selecting the orientation of the flap of the print target envelope are displayed in a selectable manner, and here, a state in which "on left" is selected is illustrated. The flap indicates a portion on which glue for closing the envelope is applied. In an envelope, the print orientation for addresses and the like is different depending on the orientation of the flap; thus, it is important to set the orientation of the flap in print settings. As the print orientation, portrait and landscape can further be set. In the example illustrated in FIG. 14A, the orientation is landscape. When settings have not been performed, the printing is continued with default settings or a comment that settings have not been performed is displayed. When the button 1402 is operated, settings related to a flap can be performed, and a setting screen 1410 of FIG. 14B is transitioned to. When the button 1404 is operated, a setting screen 1420 illustrated in FIG. 14B is transitioned to. When a button 1406, which is a "next" button, is operated, the second screen 1500 of the envelope wizard illustrated in FIG. 15A is displayed on the display operation unit 206.

FIG. 14B illustrates a flap setting screen 1410 and a sheet type setting screen 1420. In the setting screen 1410, it is possible to set a flap state 1411. In the flap state 1411, a plurality of radio buttons for setting "long edge (closed)," "long edge (open)," "short edge (closed)," and "short edge (open)" are displayed in a selectable manner. In FIG. 14B, a state in which "long edge (open)" is selected is illustrated. Since "Envelope Western-style Long No. 3" is selected as the sheet size, the radio buttons related to short edge, which cannot be selected, are grayed out in an unselectable manner. As described above, according to the present embodiment, conflict setting items are displayed in an unselectable manner depending on the setting status thus far. This makes it possible to prevent erroneous settings. When the OK button is selected, the selected setting for the flap state 1411 is reflected, and the first screen 1400 is returned to.

In addition, in the setting screen 1420 for setting the sheet type, it is possible to change the setting for the sheet type 1403. In a sheet type 1421, a list of sheet types that can be set is displayed in a selectable manner. In the sheet type setting screen in the envelope wizard, "automatic" and sheet types related to an envelope are displayed. Here, a state in which "automatic" is selected is illustrated. When the sheet type is set to "automatic", a printing apparatus sets the sheet type based on a sheet size setting that is described in print data and performs printing using parameters according to the set sheet type. By the user selecting a desired sheet type and operating the OK button, the selected sheet type setting is reflected, and the first screen 1400 is returned to. The selected sheet type is reflected in the sheet type 1403.

FIG. 15A illustrates an example of the second screen 1500 and the setting screen 1510 of the envelope wizard. The second screen 1500 is displayed on the display operation unit 206 when the button 1406, which is a "next" button, of the first screen 1400 is operated. As described above, according to the present embodiment, in order to prompt the user to set settings related to a specific sheet without omission, the display is performed in a wizard format (interactive format). The second screen 1500 is displayed including a paper feeding unit 1501, an envelope setting method 1503, and buttons 1502 and 1506.

The paper feeding unit 1501 displays the current setting status related to the paper feeding unit, and in the example of FIG. 15A, manual feeding is set. Manual feeding is a setting in which a sheet to be printed—here, an envelope—is placed on a manual feeding tray. By a button 1502, which is a paper feeding unit selection button, being operated, the setting screen 1510 is transitioned to, and the paper feeding unit setting can be changed. Aside from manual feeding, automatic or a cassette, for example, can be selected. In the envelope setting method 1503, an image 1504 on the placement of an envelope sheet and a message 1505, such as precautions at that time, are displayed. This is displayed because manual feeding is set as the paper feeding unit. By a button 1506, which is a completion button, being operated, the paper feeding unit setting is completed, the envelope wizard related to a specific sheet is ended, and the print settings screen 1200 is returned to.

The setting screen 1510 indicates a screen for selecting a paper feeding unit. The setting screen 1510 is displayed including at least a paper feeding unit list 1511 and a button 1512. The paper feeding unit list 1511 is displayed including selectable paper feeding units and unselectable paper feeding units in the corresponding printing apparatus. Here, manual feeding, the cassette 3, and the cassette 4 are displayed in a selectable manner, and the cassette 1 and the cassette 2 are grayed out in an unselectable manner. Each of the selection items may be displayed together with information, such as a sheet size, a sheet type, and a remaining amount of sheets, as information related to the paper feeding unit. When the button 1512 is operated, the latest information of each paper feeding unit is obtained, and the display of the paper feeding unit list 1511 is updated according to the obtained information.

Figure 15B:
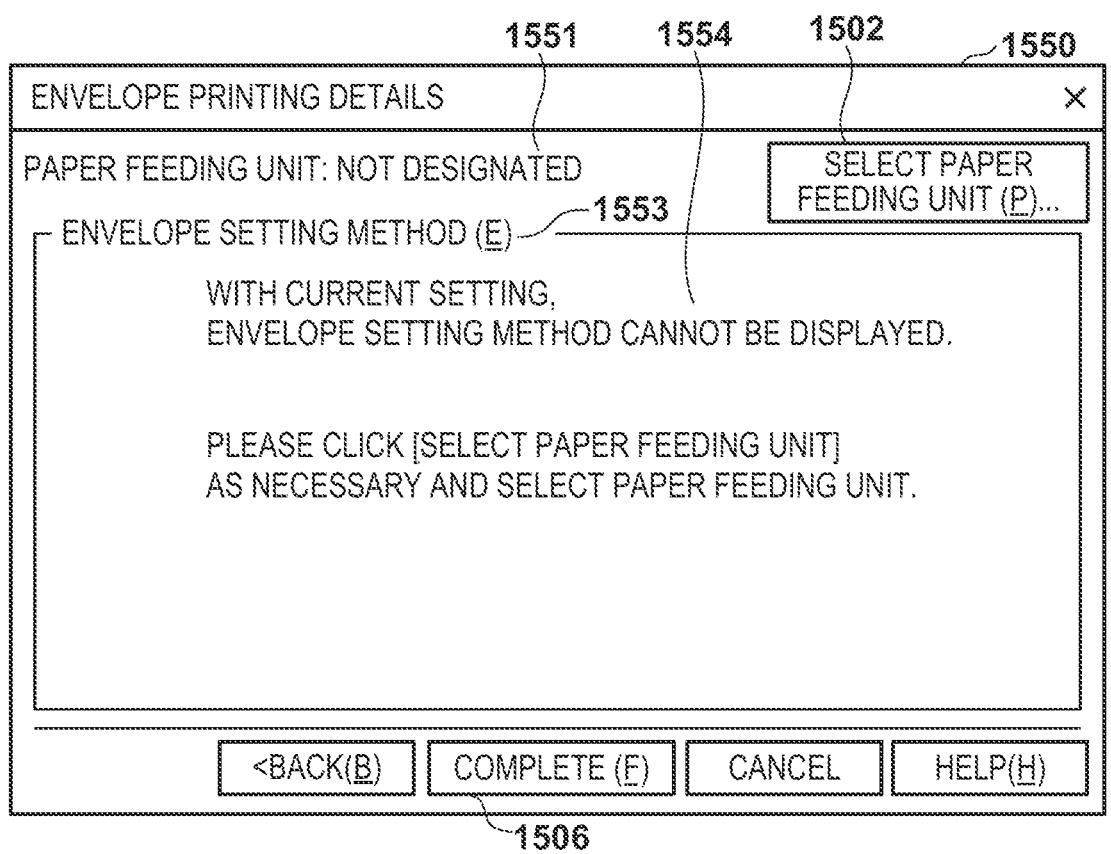
FIG. 15B is a diagram illustrating a display example 3 of the second screen of the envelope wizard according to one embodiment.

FIG. 15B illustrates a second screen 1550 for when the paper feeding unit is not designated in the second screen of the envelope wizard. Similarly to the second screen 1500, the second screen 1550 is displayed including a paper feeding unit 1551, an envelope setting method 1553, and buttons 1502 and 1506. In the second screen 1550, the setting for the paper feeding unit 1551 is "not designated". In this case, the setting for the paper feeding unit is not decided; thus, an image for the placement of an envelope sheet, such as reference numeral 1504, is not displayed, and only descriptive text that the envelope setting method cannot be displayed with the current setting (of the paper feeding unit) or the like is displayed as in reference numeral 1554. The description for the buttons 1502 and 1506 will be omitted because they are the same as in the second screen 1500.

<Print Settings Processing Procedure>

Figure 16:
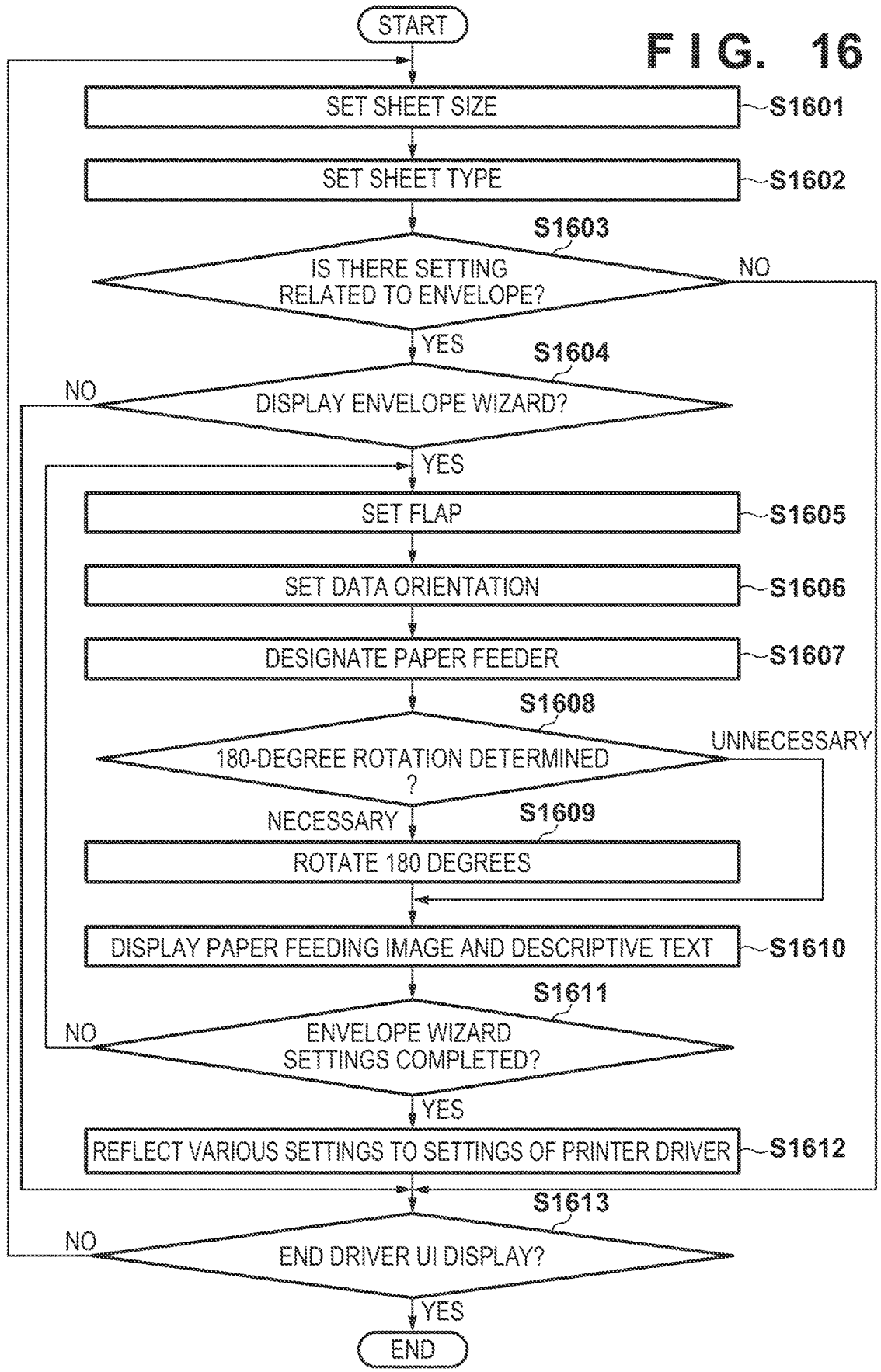
FIG. 16 is a flowchart 1 illustrating a processing procedure according to one embodiment.

Next, a print settings processing procedure according to the present embodiment will be described with reference to FIG. 16. Here, the setting procedure will be described using, as an example, printing in which an envelope sheet is used as one example of a specific sheet. The processing to be described below is realized by, for example, the CPU 201 of the host computer 101 reading a program stored in a memory, such as the ROM 203, in the RAM 202 and executing the program.

When the printer driver is started on the host computer 101, in step S1601, the CPU 201 displays the print settings screen 1200 on the display operation unit 206. At this timing, as indicated by the button 1203, the CPU 201 displays a button for displaying a screen (envelope wizard) for performing settings related to an envelope in an unselectable manner by graying it out. In step S1601, the CPU 201 receives a user operation for the document size 1201 or the output sheet size 1202 as the sheet size setting and then designates the document size or the sheet size. In the example illustrated in FIG. 12B, an example in which the document size 1201 is set is illustrated; however, processing that is similar to the following is performed even when the output sheet size 1202 is set.

Subsequently, in step S1602, the CPU 201 similarly receives the designation of a sheet type that is desired by the user in the sheet type setting 1301 in the print settings screen 1300 of the "paper feeding" tab. The reception of the sheet type setting 1301 is optional; when it is not received, "automatic", for example, may be selected as the default setting. When it is "automatic", a corresponding sheet type is automatically set according to the document size 1201 or the paper feeding unit setting.

Next, in step S1603, the CPU 201 determines whether a setting related to a specific sheet (here, a setting related to an envelope) is performed on one or both of the sheet size and the sheet type. The determination is performed regardless of whether a change of the setting of the sheet size and the sheet type is received in step S1601 and step S1602, respectively, and if a setting change has not been performed, the determination is performed using the default setting. In step S1603, if it is determined that at least one of the sheet size and the sheet type is a setting related to a specific sheet, the processing proceeds to step S1604; otherwise, the processing proceeds to step S1613. The sheet type setting of "automatic" is not considered a setting related to a specific sheet. Therefore, if the sheet type setting is set to "automatic", the CPU 201 determines whether a special sheet is set based on the setting value set in the sheet size.

In step S1604, the CPU 201 switches the button 1203, which is for displaying the envelope wizard and is displayed in an unselectable manner by being grayed out, to the display of the selectable button 1205. Furthermore, it is determined whether the button 1205 has been operated. When the button 1205 is operated, the processing proceeds to step S1605; otherwise, the processing proceeds to step S1613.

In step S1605, the CPU 201 displays the first screen 1400 of the envelope wizard on the display operation unit 206. In the first screen 1400, the sheet size 1401 and the sheet type 1403 are displayed in a changeable manner, and the setting of the print data orientation 1405 is received. In addition, the button 1402, which is for displaying the setting screen 1410 for setting a state of the flap of the envelope of the selected sheet size 1401, is displayed, and when the button 1402 is operated, the setting screen 1410 for setting the state of the flap is displayed on the display operation unit 206. In the setting screen 1410, the user is prompted to select whether to perform paper feeding with the flap in a closed or open state. In the example of FIG. 14A, the selected sheet size is "Envelope Western-style Long No. 3". Since the flap of the envelope of this standard size is provided only in the long-edge direction, in the setting screen 1410, the flap in the short-edge direction cannot be designated and, thus, is in a state in which it is grayed out and cannot be selected.

In step S1606, the CPU 201 sets the print data orientation 1405 that accords with the selected sheet size 1401 and flap state 1411 of the envelope according to a user operation. The sheet type 1403 can be changed by selecting an envelope type listed in the sheet type setting screen 1420 of FIG. 14B, which is displayed by the setting button 1404 being operated. The processing of steps S1605 and S1606 is not limited to the processing being performed in this order and is performed in order according to the user operation.

Next, when the button 1406 of the first screen 1400 of the envelope wizard is operated, in step S1607, the CPU 201 displays the second screen 1500 of the envelope wizard on the display operation unit 206. Here, the paper feeding unit 1501 is set according to a user operation. In order to change the paper feeding unit, in the setting screen 1510, which is displayed by the button 1502 being operated, information of paper feeders that can feed an envelope of a currently-selected sheet size is displayed in a list, and a selection is made from the list. If the printer driver is in a state in which it is capable of communication, by operating the button 1512 for obtaining the latest information of paper feeding units, it is possible to update information, such as the sizes and types of sheets that are set in the current printing apparatus. Meanwhile, paper feeders that cannot feed the currently-selected sheet size are displayed in an unselectable manner, such as being grayed out.

Next, in step S1608, the CPU 201 determines whether to rotate a print image 180 degrees to obtain a print result that is desired by the user based on the sheet size, the flap state, and the paper feeding unit information that have been set via the print settings screens 1200 and 1300 and the envelope wizard. In the present embodiment, print data is generated, assuming that the orientation of the image data outputted by the application 801 is the correct orientation. If a setting is made to rotate the print image 180 degrees, the printer rotates the print image included in the received print data 180 degrees and performs printing. For example, it is determined whether the print image needs to be rotated 180 degrees in order to obtain a print result represented in the print data orientation 1405. When it is determined that the image needs to be rotated, the processing proceeds to step S1609; otherwise, the processing proceeds to step S1610. In step S1609, the CPU 201 stores, in a memory, such as the RAM 202 or the external memory 211, a flag or the like for issuing an image rotated 180 degrees and proceeds to step S1610. The details of steps S1608 and S1609 will be described later with reference to FIGS. 18A-18B. In step S1610, when the paper feeding unit is changed to "manual feeding", the CPU 201 displays the image 1504 on the placement of the envelope sheet for the designated paper feeding unit and the message 1505, such as precautions at that time, together in the envelope setting method 1503 on the second screen 1500. When the second screen 1500 is displayed in step S1607, if the paper feeding unit is already set to "manual feeding", the above-described envelope setting method 1503 will be displayed. That is, the processing of step S1610 is performed according to a user operation and is not limited to the order of the flowchart described in FIG. 16. When the processing of step S1610 is completed, the processing proceeds to step S1611.

In step S1611, the CPU 201 determines whether the button 1506, which is a completion button, has been operated. When it is determined that the button 1506 has been operated, the display of the envelope wizard is completed, and the processing proceeds to step S1612. Meanwhile, if it is determined that the button 1506 has not been operated, the processing returns to step S1605. In step S1612, the CPU 201 reflects the sheet size, the sheet type, the printing orientation, the 180-degree rotation setting, and the like that have been set in the envelope wizard to the various settings of the print settings screens 1200 and 1230 and the like of the printer driver. Subsequently, in step S1613, the CPU 201 determines whether to end the UI display of the printer driver according to the operation of the OK button 1205 or the like. When it is determined to not end the display, the processing returns to step S1601; when it is determined to end the display, the processing of this flowchart ends.

In step S1603, if it is determined that neither the sheet size nor the sheet type is a setting that is related to an envelope, the button 1203 for displaying the envelope wizard will be in an unselectable state.

Here, a condition for determining in step S1603 whether a sheet is a specific sheet (envelope or postcard) will be described. Table 1 below indicates an example of sheet sizes and sheet types for when it will be determined that a sheet is an envelope.

TABLE 1

| Sheet Size | Sheet Type |
| --- | --- |
| Rectangle No. 2 | Envelope (64 to 75 g/m$^2$) |
| Western-style No. 3 | Envelope (76 to 105 g/m$^2$) |
| Monarch | Envelope (106 to 150 g/m$^2$) |
| Com10 | Western-style Envelope (76 to 105 g/m$^2$) |

It is assumed that, in the setting screen 1420 illustrated in FIG. 14B, the envelope sheet types that are in a conflict relationship with the selected sheet size is not displayed as sheet types. To describe using the above example of Table 1, assume that Rectangle No. 2 is a domestic (Japanese) envelope sheet size (the flap is in a short-edge position) but is in a conflict relationship with the sheet type Western-style envelope 76 to 105 g/m$^2$. This is premised upon the flap being on the long edge in a Western-style envelope. In this case, if Rectangle No. 2 is selected, the Western-style envelope (76 to 105 g/m$^2$) will not be displayed on the setting screen 1420.

Furthermore, when the setting of the paper feeding unit 1303 of the print settings screen 1300 is "automatic", the paper feeding unit 1551 of FIG. 15B will be "not designated"; thus, the paper feeding unit is not decided. In this case, an image on the placement of an envelope sheet, such as reference numeral 1504 of the second screen 1500, is not displayed, and only descriptive text that the envelope setting method cannot be displayed in the current setting (of the paper feeding unit) or the like is displayed as in reference numeral 1554.

<180-Degree Rotation Processing>

Figure 17:
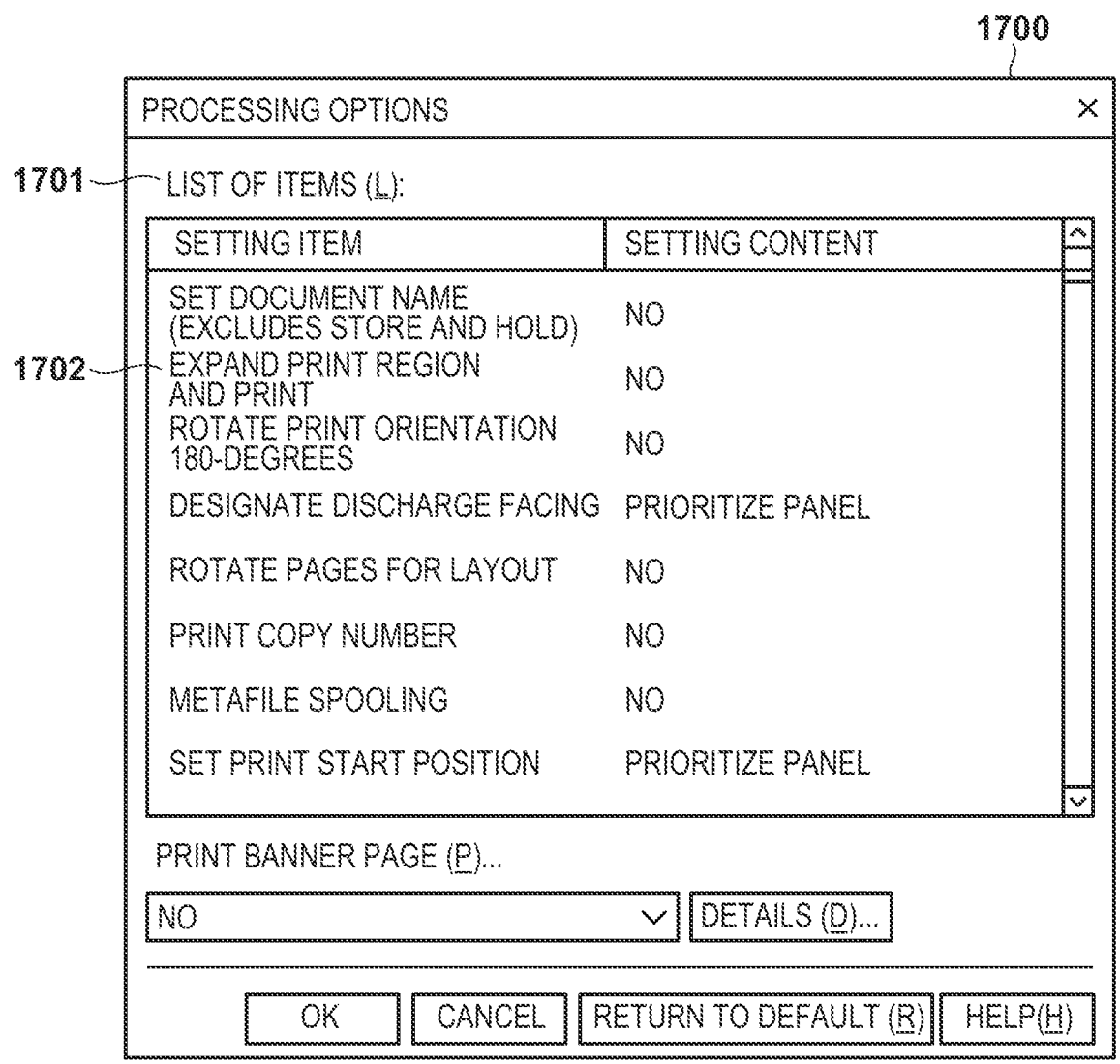
FIG. 17 is a diagram illustrating a printer driver display example 5 according to one embodiment.
Figure 18A:
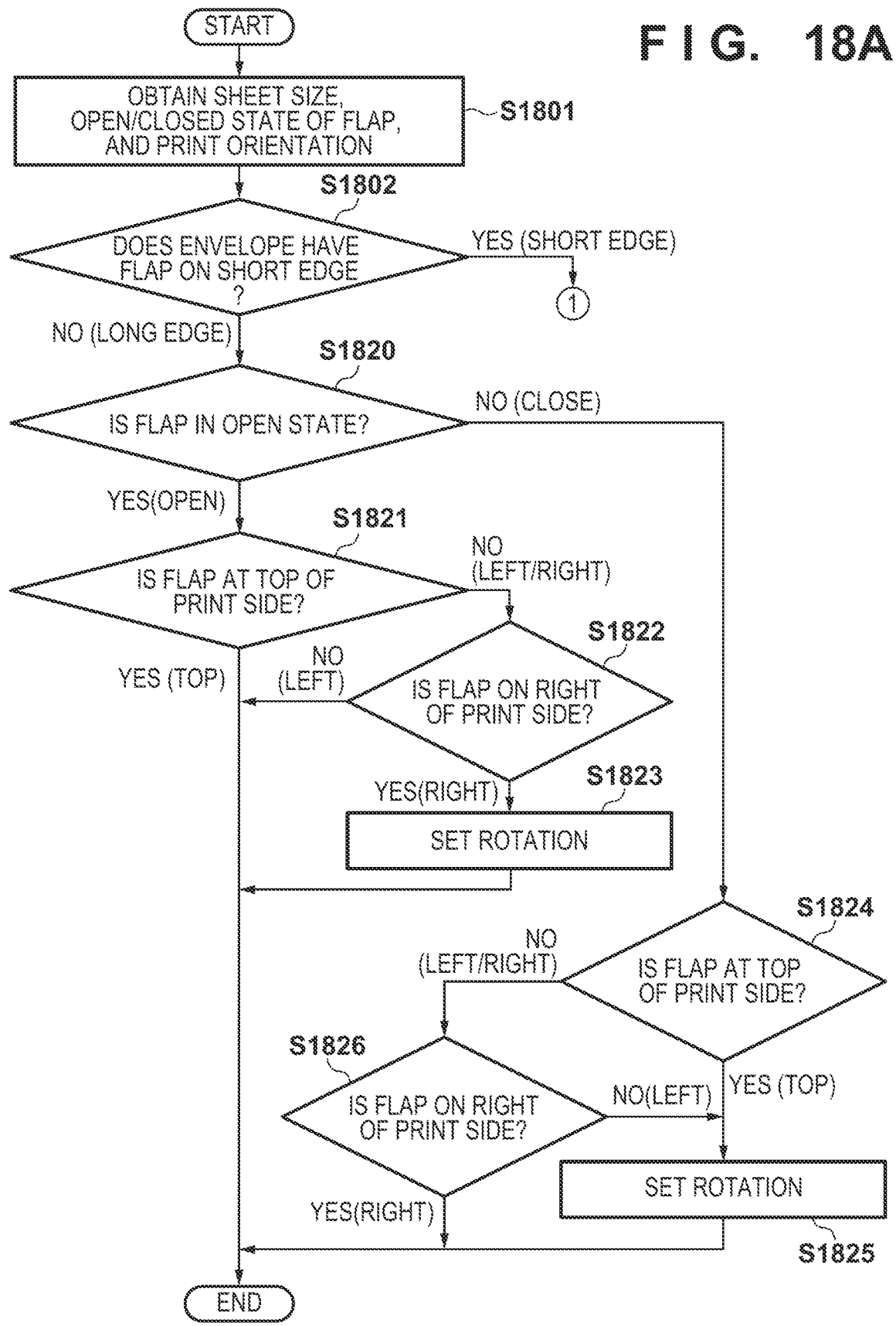
FIGS. 18A-18B are a flowchart 2 illustrating a processing procedure according to one embodiment.
Figure 18B:
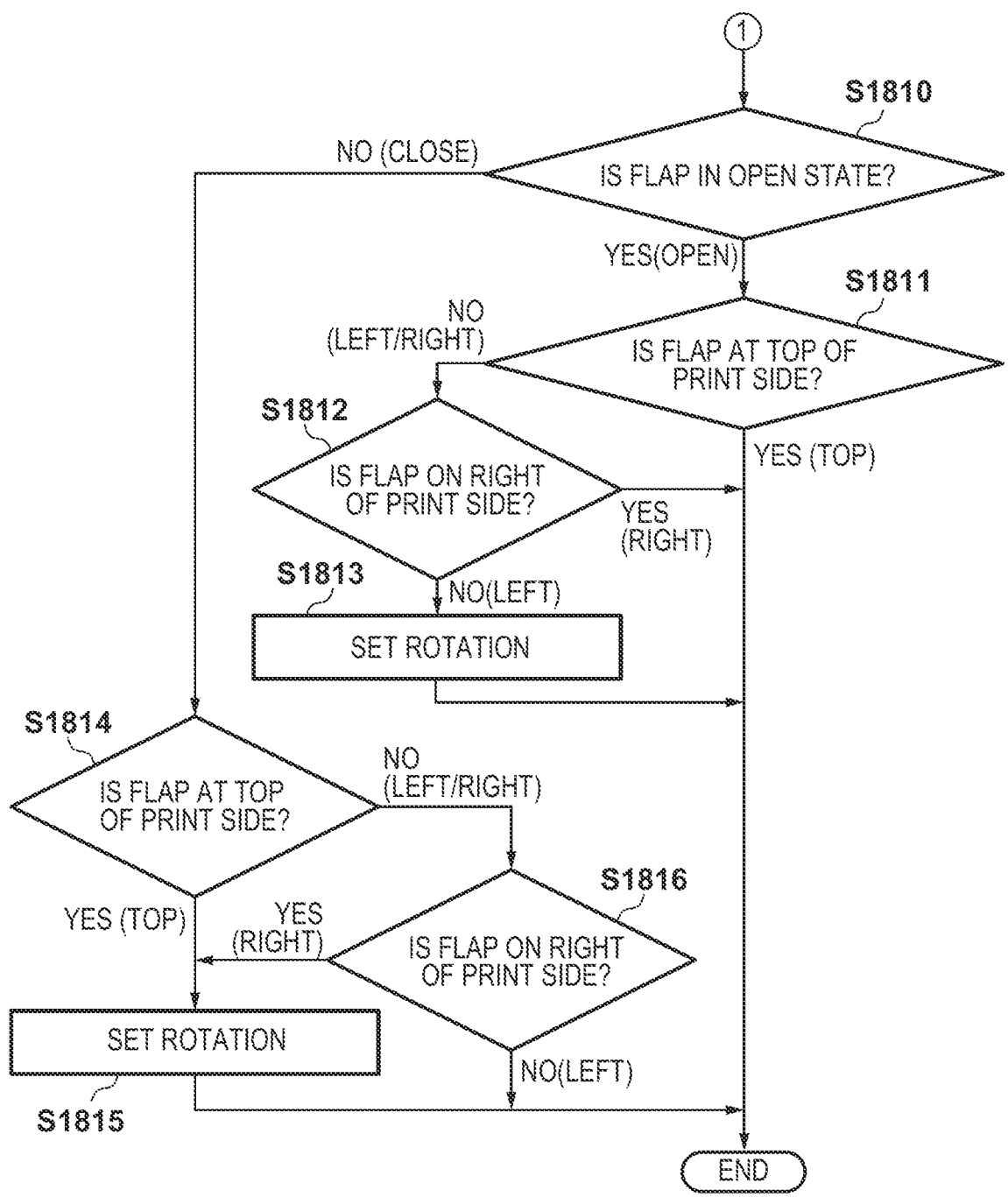

Next, detailed processing of the above-described steps S1608 and S1609 will be described with reference to FIGS. 17, 18A and 18B. First, a screen indicating the setting contents of print settings processing options will be described with reference to FIG. 17. For example, a screen 1700 is displayed on the display operation unit 206 by a button for setting processing options included in the "print quality" tab of the print settings screen 1200 being operated. In reference numeral 1701, a list of processing items is displayed, and by selecting any item, detailed settings can be performed in a lower region. In the item list 1701, as indicated by reference numeral 1702, a setting item as to whether to rotate the print orientation 180 degrees is displayed. Regarding this setting item, in the above-described step S1608, it is determined whether to perform a 180-degree rotation based on the sheet size, the open/closed state of the flap, the print orientation, and the like. This determination greatly depends on the specifications of the main body of the target printing apparatus. In the following description, in an envelope in which the flap is on the long edge, the sheet orientation when the flap is open and the sheet orientation when the flap is closed are different by 180 degrees; however, in both cases, the orientation of paper feeding is set to be paper feeding in the short-edge direction. In addition, it is assumed that, in an envelope in which the flap is on the long edge, the paper feeding orientation in a state in which the flap is open is paper feeding in the long-edge direction, and the paper feeding orientation in a state in which the flap is closed is paper feeding in the short-edge direction. In a case where the user does not open the envelope wizard and does not perform the settings, print data in which the value set on the screen illustrated in FIG. 17 is described for the 180-degree rotation setting, is transmitted to the printing apparatus.

The flowchart of FIGS. 18A-18B will be described. The processing to be described below is realized by, for example, the CPU 201 of the host computer 101 reading a program stored in a memory, such as the ROM 203, in the RAM 202 and executing the program.

In step S1801, the CPU 201 obtains the sheet size, the open/closed state of the flap, and print orientation (of the envelope) from the setting contents as input values. Next, in step S1802, the CPU 201 determines whether the edge having the flap in that sheet size is on the short edge side. If the flap is on the short edge side, the processing proceeds to step S1810; if the flap is on the long edge side, the processing proceeds to step S1820.

In step S1810, the CPU 201 determines if the flap is in an open state and proceeds to step S1811 if it is in an open state and proceeds to step S1814 if it is in a closed state. In step S1811, the CPU 201 determines whether the setting is such that the flap is at the top as the print orientation. When the setting is such that the flap is at the top, it is determined not to rotate the print image 180 degrees, and the processing of this flowchart ends. Meanwhile, if the setting is such that the flap is on the left or right, the processing proceeds to step S1812, and the CPU 201 determines whether the flap is on the right. When the flap is on the right, it is determined not to rotate the print image 180 degrees, and the processing of this flowchart ends. Meanwhile, if it is determined that the flap is on the left, the processing proceeds to step S1813, and the CPU 201 sets the print image to be rotated 180 degrees and ends the processing of this flowchart.

In addition, if it is determined in step S1810 that the flap is in a closed state, the CPU 201 determines in step S1814 whether the setting is such that the flap is at the top as the print orientation. If the flap is at the top, the processing proceeds to step S1815, and the CPU 201 sets the print image to be rotated 180 degrees and ends the processing of this flowchart. If the flap is on the left or right, the processing proceeds to step S1816, and the CPU 201 determines whether the flap is on the right. If the flap is on the right, the processing proceeds to step S1815, and the CPU 201 sets the print image to be rotated 180 degrees and ends the processing of this flowchart. Meanwhile, when the flap is on the left, it is determined not to rotate the print image 180 degrees, and the processing of this flowchart ends.

In addition, if it is determined in step S1802 that the flap is on the long edge, the CPU 201 determines in step S1820 whether the flap is in an open state. When it is determined that the flap is in an open state, the processing proceeds to step S1821, and when it is determined that the flap is in a closed state, the processing proceeds to step S1824. In step S1821, the CPU 201 determines whether the setting is such that the flap is at the top as the print orientation. When the flap is at the top, it is determined not to rotate the print image 180 degrees, and the processing of this flowchart ends. Meanwhile, if the flap is on the left or right, the processing proceeds to step S1822, and the CPU 201 determines whether the flap is on the right. If the flap is on the right, the processing proceeds to step S1823, and the CPU 201 sets the print image to be rotated 180 degrees and ends the processing of this flowchart. Meanwhile, when the flap is on the left, it is determined not to perform the 180-degree rotation, and the processing of this flowchart ends.

In addition, if it is determined in step S1820 that the flap is in a closed state, the CPU 201 determines in step S1824 whether the setting is such that the flap is at the top for the print orientation. If the flap is at the top, the processing proceeds to step S1825, and the CPU 201 sets the print image to be rotated 180 degrees and ends the processing of this flowchart. Meanwhile, if the flap is on the left or right, the processing proceeds to step S1826, and the CPU 201 determines whether the flap is on the right. If the flap is on the left, the processing proceeds to step S1825, and the CPU 201 sets the print image to be rotated 180 degrees and ends the processing of this flowchart. Meanwhile, when the flap is on the right, it is determined not to rotate the print image 180 degrees, and the processing of this flowchart ends.

In the present embodiment, as described above, the printer driver sets whether to perform a 180-degree rotation according to the setting values that have been set in the envelope wizard. This makes it possible to reduce the burden on the user of having to set the setting value for a 180-degree rotation based on the size and type of the envelope to be used, the position and open/closed state of the flap, and the like.

<Setting Pattern>

FIGS. 19A-19B illustrates a pattern for the rotation setting and the like for each combination of settings for envelope printing. FIGS. 19A-19B include the rotation setting results of when the rotation determination of FIGS. 18A-18B is performed according to the respective combinations of setting contents. A table 1900 indicates, for each row, a pattern including the position of the flap, the open/closed state of the flap, the orientation of print data, the paper feeding unit, the print side, the 180-degree rotation setting, and the image 1504, which is a display image. The external memory 211 stores a table that includes the information indicated in the table 1900 and the table is used when displaying the various setting screens. For example, when displaying the above-described image 1504, a corresponding image is selected from the table according to the setting parameters and then displayed.

As described above, due to various conditions, the position from which the paper is fed and the placement of the envelope depends greatly on the specifications of the main body of the printing apparatus. As illustrated in FIGS. 19A-19B, the setting of whether to rotate the print image 180 degrees is different depending on the pattern of setting parameters. As described with reference to the flowchart of FIGS. 18A-18B, whether to rotate the printed image 180 degrees is different depending on the setting parameters, which are the position and open/closed state of the flap and the orientation of the print data.

The display image is also different depending on the setting parameters. For example, reference numeral 1901 is a pattern for when the envelope having the flap on the short-edge side and in an open state is used as the print target and, further, the manual feeding unit is used. In this case, the envelope needs to be set so that the edge that is opposite to the flap (the bottom portion of the envelope) is on the printing apparatus side and the print side is facing up, and the corresponding display image is indicated. There is a possibility that the position of the flap and the side of the envelope may be set differently depending on the specifications of the printing apparatus. Meanwhile, as indicated in reference numeral 1902, even when the envelope having the flap on the short-edge side and in an open state is used as the print target as in reference numeral 1901, when the paper feeding unit is the cassette, the print side is the bottom side; thus, the image is that in which the envelope is set such that the back side of the envelope is facing up. Regarding reference numeral 1903, the image is that in which the envelope having the flap on the long-edge side and in a closed state (the flap is inserted into the envelope) is set in the manual feeding unit.

<Print Data>

FIG. 20 illustrates an example of a schematic view of print data in the case of reference numeral 1901. Reference numeral 2000 schematically indicates a piece of data that is related to the print settings, excluding the image data of the print data. The sheet size is Rectangle No. 2 in which the position of the flap is on the short-edge side, the print orientation is landscape, and the paper feeding unit is manual feeding. Since the position of the flap is on the left with respect to the print data, it is also indicated that, as a result of following the physical feeding contents, the print image needs to be rotated 180 degrees. As illustrated in reference numeral 1702 on the screen 1700, "rotate print orientation 180 degrees" is displayed as a processing option; however, only the image data that has been rotated 180 degrees may be included and a command or the like that specifies a specific 180-degree rotation need not be included.

As described above, the information processing apparatus according to the present embodiment performs print settings according to a user operation via setting screens for a print job for which a request is to be made to a printing apparatus. In addition, when a setting screen is displayed on a display unit and the settings related to a specific sheet is made, the information processing apparatus switches a predetermined object included in the setting screen from a display in which it cannot be selected by the user to a display in which it can be selected by the user. This makes it possible to reduce undesired printing on a specific sheet.

The present invention is not limited to the above-described embodiments, and various modifications are possible. In the above-described embodiments, description has been given for an envelope as an example of a specific sheet. However, the present invention can be applied to another specific sheet that requires a specific placement method, such as a postcard on which a postal code field is printed, and the scope of application of the present invention is not limited to an envelope.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-138344, filed Aug. 31, 2022, which is hereby incorporated by reference herein in its entirety.

What is claimed is:

1. An information processing apparatus comprising:
   at least one memory device that stores a set of instructions; and
   at least one processor that executes the set of instructions to:
   display a setting screen on a display unit;
   change, in a case where a setting related to an envelope is received in the setting screen, a predetermined object included in the setting screen from a display in which the predetermined object cannot be selected by the user to a display in which the predetermined object can be selected by the user;
   receive settings for the envelope after the predetermined object is selected by the user in the setting screen, the settings including a first setting of a flap of the envelope and a second setting of a sheet holding unit from which the envelope is fed; and
   display, based on the first setting and the second setting, information for notifying a method for setting the envelope to the sheet holding unit.

2. The information processing apparatus according to claim 1, wherein a plurality of screens for receiving the settings for the envelope are sequentially displayed according to user operations such that settings are completed in an interactive format.

3. The information processing apparatus according to claim 1, wherein
   in the case where the predetermined object that is displayed in the selectable manner is operated by the user, a second setting screen for receiving at least a part of the settings for the envelope is displayed on the display unit, and
   in a case where a predetermined user operation is performed on the setting screen, a third setting screen for receiving at least another part of the settings for the envelope is displayed.

4. The information processing apparatus according to claim 1, wherein the envelope is a sheet that needs to be placed in a specific orientation in the sheet holding unit of the printing apparatus.

5. The information processing apparatus according to claim 1, wherein the first setting includes a setting of a position of the flap and an open/closed state of the flap.

6. The information processing apparatus according to claim 1, wherein the information is an image for notifying the method for setting the envelope to the sheet holding unit.

7. The information processing apparatus according to claim 1, wherein the settings are received on a plurality of screens displayed in a wizard format.

8. The information processing apparatus according to claim 6, wherein the image is an image for notifying an orientation for placing the envelope on the sheet holding unit.

9. The information processing apparatus according to claim 5, wherein the at least one processor further executes the set of instructions to:
    determine whether a print image needs to be rotated based on settings for the position and the open/closed state of the flap of the envelope and an orientation of the print data.

10. The information processing apparatus according to claim 1, wherein in a case where the predetermined object is changed to the display in which the predetermined object can be selected, the predetermined object is displayed in an emphasized manner.

11. The information processing apparatus according to claim 1, wherein the display in which the predetermined object cannot be selected is a display in which the predetermined object is grayed out.

12. The information processing apparatus according to claim 1, wherein in the setting screen, the predetermined object is arranged near an object for performing the setting related to the envelope.

13. A method of controlling an information processing apparatus, the method comprising:
    displaying a setting screen on a display unit;
    changing, in a case where a setting related to an envelope is received in the setting screen, a predetermined object included in the setting screen from a display in which the predetermined object cannot be selected by the user to a display in which the predetermined object can be selected by the user;
    receiving settings for the envelope after the predetermined object is selected by the user in the setting screen, the settings including a first setting of a flap of the envelope and a second setting of a sheet holding unit from which the envelope is fed; and
    displaying, based on the first setting and the second setting, information for notifying a method for setting the envelope to the sheet holding unit.

14. A non-transitory computer-readable storage medium storing a computer program for causing a computer to execute each step of a method of controlling an information processing apparatus, the method comprising:
    displaying a setting screen on a display unit;
    changing, in a case where a setting related to an envelope is received in the setting screen, a predetermined object included in the setting screen from a display in which the predetermined object cannot be selected by the user to a display in which the predetermined object can be selected by the user;
    receiving settings for the envelope after the predetermined object is selected by the user in the setting screen, the settings including a first setting of a flap of the envelope and a second setting of a sheet holding unit from which the envelope is fed; and
    displaying, based on the first setting and the second setting, information for notifying a method for setting the envelope to the sheet holding unit.

15. The non-transitory computer-readable storage medium according to claim 14, wherein a plurality of screens for receiving the settings for the envelope are sequentially displayed according to user operations such that the settings are completed in an interactive format.

16. The non-transitory computer-readable storage medium according to claim 14, wherein
    in the case where the predetermined object that is displayed in the selectable manner is operated by the user, a second setting screen for receiving at least a part of the settings for the envelope is displayed on the display unit, and
    in a case where a predetermined user operation is performed on the first setting screen, a third setting screen for receiving at least another part of the settings for the envelope is displayed.

17. The non-transitory computer-readable storage medium according to claim 14, wherein the envelope is a sheet that needs to be placed in a specific orientation in the sheet holding unit of the printing apparatus.

18. The non-transitory computer-readable storage medium according to claim 14, wherein
    the first setting includes a setting of a position of the flap and an open/closed state of the flap.

19. The non-transitory computer-readable storage medium according to claim 14, wherein the information is an image for notifying the method for setting the envelope to the sheet holding unit.

20. The non-transitory computer-readable storage medium according to claim 14, wherein the settings are received on a plurality of screens displayed in a wizard format.

21. The non-transitory computer-readable storage medium according to claim 19, wherein the image is an image for notifying an orientation for placing the envelope on the sheet holding unit.

22. The non-transitory computer-readable storage medium according to claim 18, wherein the computer program causes the computer to execute a further method, the further method comprising:
    determining whether a print image needs to be rotated based on settings for the position and the open/closed state of the flap of the envelope and an orientation of the print data.

23. The non-transitory computer-readable storage medium according to claim 14, wherein in a case where the predetermined object is changed to the display in which the predetermined object can be selected, the predetermined object is displayed in an emphasized manner.

24. The non-transitory computer-readable storage medium according to claim 14, wherein the display in which the predetermined object cannot be selected is a display in which the predetermined object is grayed out.

25. The non-transitory computer-readable storage medium according to claim 14, wherein in the setting screen, the predetermined object is arranged near an object for performing the setting related to the envelope.

* * * * *